United States Patent [19]

Mishina et al.

[11] Patent Number: 5,226,135
[45] Date of Patent: Jul. 6, 1993

[54] METHOD FOR SORTING VECTOR DATA ON THE BASIS OF PARTIAL VECTORS AND VECTOR PROCESSOR

[75] Inventors: Yusuke Mishina, Kunitachi; Keiji Kojima, Kodaira, both of Japan

[73] Assignee: Hitachi, Ltd., Tokyo, Japan

[21] Appl. No.: 363,894

[22] PCT Filed: Sep. 22, 1988

[86] PCT No.: PCT/JP88/00971

§ 371 Date: May 25, 1989

§ 102(e) Date: May 25, 1989

[87] PCT Pub. No.: WO89/03091

PCT Pub. Date: Apr. 6, 1989

[30] Foreign Application Priority Data

Sep. 25, 1987 [JP] Japan .................. 62-238717

[51] Int. Cl.$^5$ .................. G06F 7/08; G06F 7/14; G06F 7/16; G06F 7/20

[52] U.S. Cl. .................. 395/425; 364/229.5; 364/232.21; 364/245.1; 364/246; 364/252.3; 364/252.4; 364/252.5; 364/253.1; 364/256.8; 364/DIG. 1; 395/800

[58] Field of Search .................. 364/200, 900; 395/800, 395/600, 375, 275; 400, 650, 425

[56] References Cited

U.S. PATENT DOCUMENTS

| | | | |
|---|---|---|---|
| 3,794,984 | 2/1974 | Deerfield et al. | 364/200 |
| 3,827,031 | 6/1974 | Kastner et al. | 364/200 |
| 4,172,287 | 10/1979 | Kawabe et al. | 364/200 |
| 4,293,741 | 10/1981 | Muraoka et al. | 364/200 |
| 4,575,798 | 3/1986 | Lindstrom et al. | 364/300 |
| 4,594,682 | 6/1986 | Drimak | 364/900 |
| 4,620,275 | 10/1986 | Wallach et al. | 364/200 |
| 4,679,139 | 6/1987 | Durbin | 364/200 |
| 4,799,152 | 1/1989 | Chuang et al. | 364/200 |
| 4,811,199 | 3/1989 | Kuechler et al. | 395/600 |
| 4,817,036 | 3/1989 | Millett et al. | 395/600 |
| 4,890,220 | 12/1989 | Nakagawa et al. | 364/200 |
| 4,949,247 | 8/1990 | Stephenson et al. | 364/200 |
| 4,949,292 | 8/1990 | Hoshino et al. | 364/200 |
| 5,014,196 | 5/1991 | Hayashi et al. | 364/200 |

FOREIGN PATENT DOCUMENTS 61-16326 1/1986 Japan .
61-42031 2/1986 Japan .

Primary Examiner—Thomas C. Lee
Assistant Examiner—Daniel H. Pan
Attorney, Agent, or Firm—Antonelli, Terry, Stout & Kraus

[57] ABSTRACT

A vector processor is provided for nonnumeric processing, and more particularly for performing a sort method which performs sorting at a high speed. It is an object to provide a method for sorting, by vector processing, keys whose lengths are longer than a sortable given length determined by the vector processor. In the sort method, partial keys of the keys which are equal in length to the given length are extracted and they are sorted by the vector processing. If there are partial keys of the same value as a result of the sorting, the succeeding partial keys of those partial keys having the same value are extracted and they are sorted. In this manner, the sorting of the original keys is permitted. The vector processor is provided with circuits for extracting the partial keys, sorting and detecting the partial keys having the same value in the sorted partial keys, all by vector processing.

7 Claims, 15 Drawing Sheets

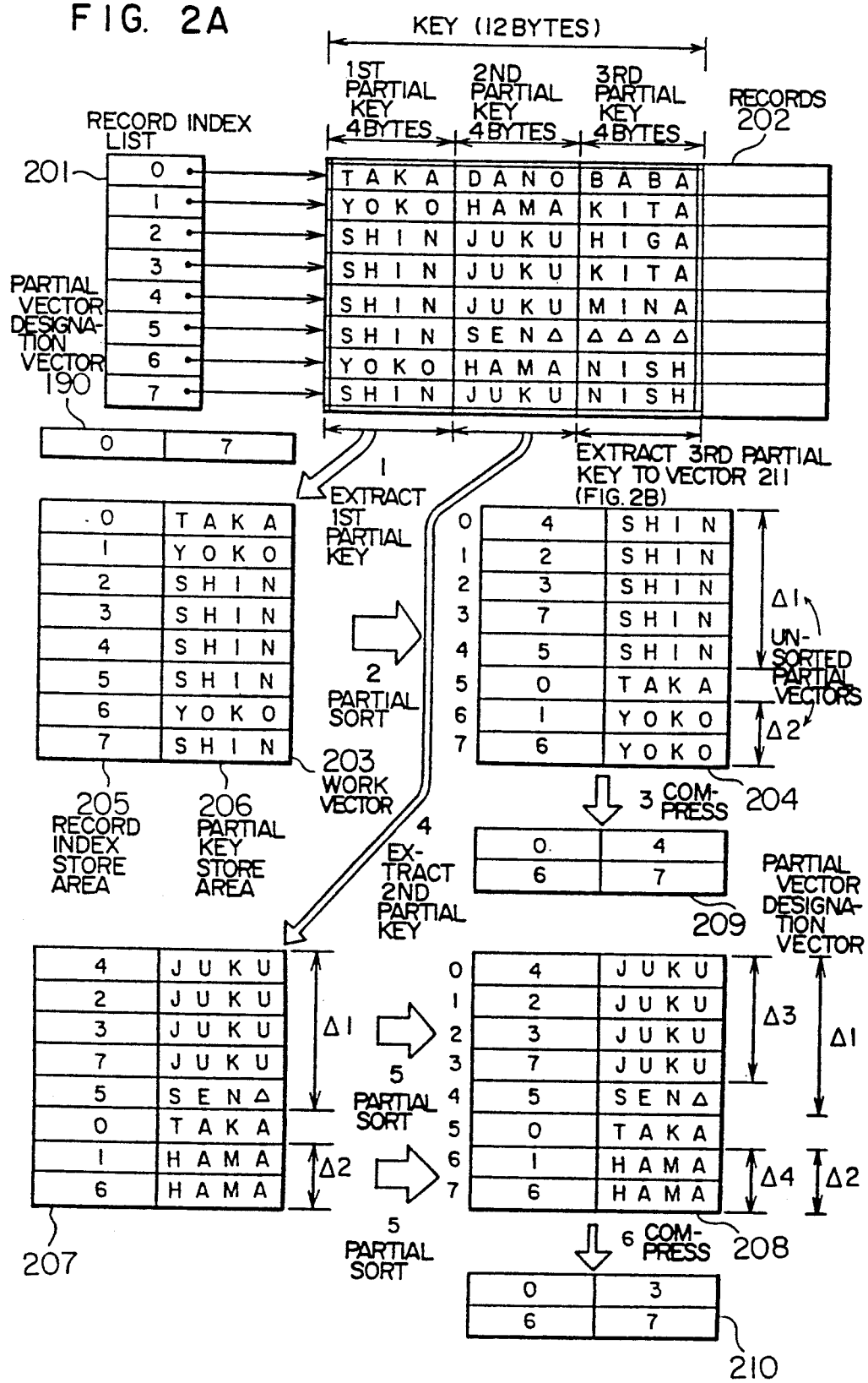

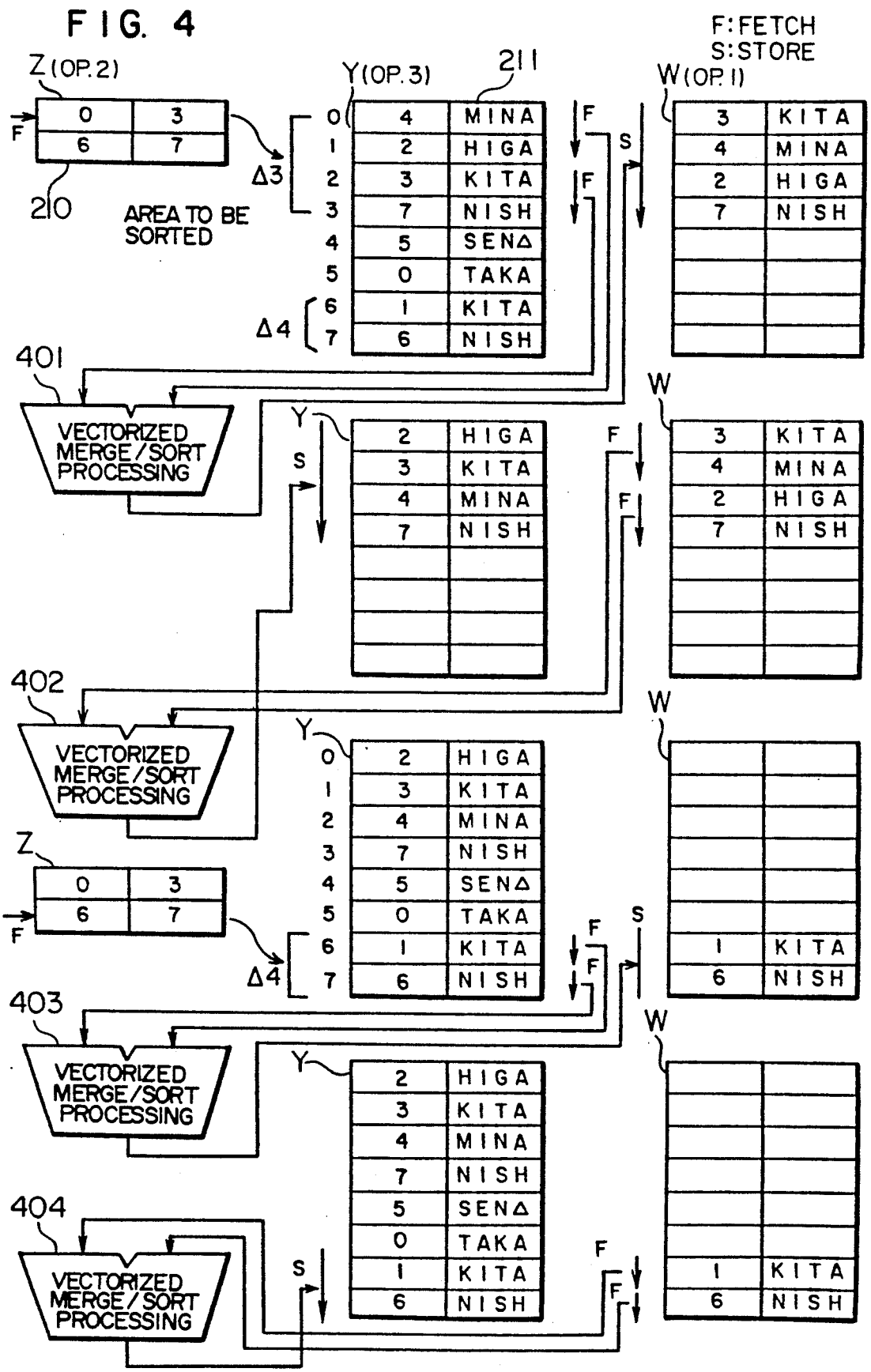

| GENERAL PURPOSE REGISTER | COMPRESSION INSTRUCTION | MULTI-SORT INSTRUCTION |
|---|---|---|
| GPR (R1) | NUMBER OF ELEMENTS OF VECTOR X | NUMBER OF ELEMENTS OF VECTOR Z |
| GPR (R2) | TOP ELEMENT ADDRESS OF VECTOR X | TOP ELEMENT ADDRESS OF VECTOR Z |
| GPR (R2+1) | TOP ELEMENT ADDRESS OF VECTOR Y | TOP ELEMENT ADDRESS OF VECTOR Y |
| GPR (R2+2) | TOP ELEMENT ADDRESS OF VECTOR Z | TOP ELEMENT ADDRESS OF VECTOR W |

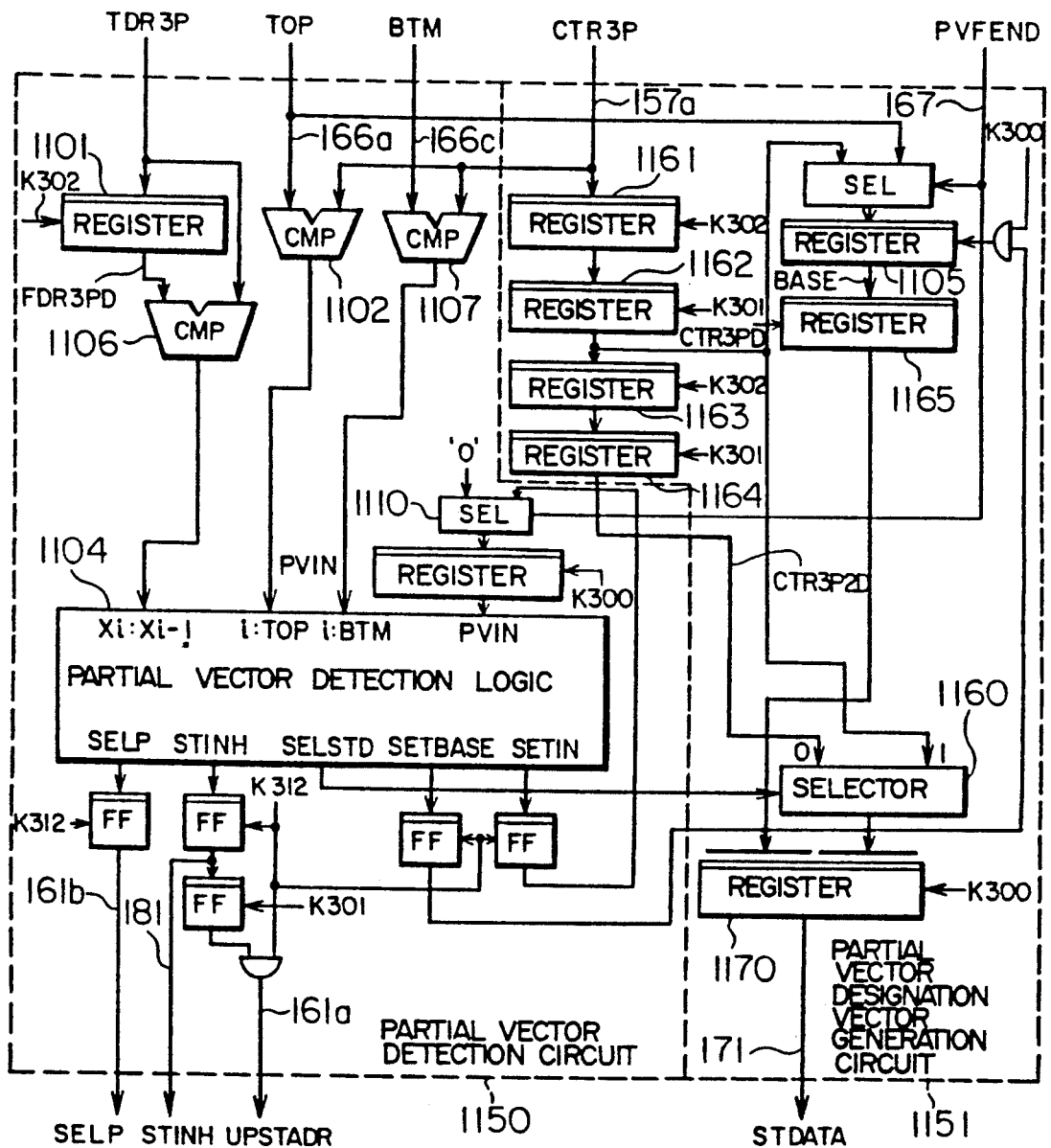

| ITEM NUMBER | X:Y | i:MID-1 | j:BTM | SLNGCMP | SELP | STINH |
|---|---|---|---|---|---|---|
| 1 | ≤ | ≤ | ≤ | = | 1 | 0 |
| 2 | > | ≤ | ≤ | = | 0 | 0 |
| 3 | — | ≤ | ≤ | < | 1 | 0 |
| 4 | — | ≤ | ≤ | > | 0 | 0 |
| 5 | — | ≥ | ≤ | — | 0 | 0 |
| 6 | — | ≤ | > | — | 1 | 0 |
| 7 | — | > | > | — | — | 1 |

METHOD FOR SORTING VECTOR DATA ON THE BASIS OF PARTIAL VECTORS AND VECTOR PROCESSOR

BACKGROUND OF THE INVENTION

The present invention relates to a method for sorting vector data and a vector processor suitable thereto.

When nonnumeric processing such as sorting or merging is performed by a scalar processor, the processing speed is low. In order to improve the processing speed, a method for performing nonnumeric processing such as sorting by a vector processor has been used and a vector processor therefor has been described in U.S. patent application Ser. No. 06/685,116 (filed on Dec. 21, 1984), now U.S. Pat. No. 4,779,192, assigned to the assignee of the present invention. As such a vector processor, an "integrated database processor of M 680H computer" is marketed by the present assignee.

In the above U.S. Patent Application and the above "integrated database processor", vector instructions exclusively used for sorting and a circuit for sorting vector data driven by the vector instructions are utilized. On the other hand, in the technique described in a Technical Report of the Institute of Electronics, Information and Communication Engineers of Japan, COMP 86-88 (pp. 79-85), a conventional numeric processing vector processor and basic vector instructions prepared therefor, for example, a move vector instruction and a plurality of vector operation instructions for arithmetic or logical operations are utilized.

In general, the vector processor enhances the processing speed by continuously processing a plurality of vector elements (vector processing) by means of a pipeline operated circuit. In order to enhance the processing speed, it is desirable to use a separate circuit for exclusively performing each one of different vector processings.

In this sense, the above "integrated database processor" is suitable for high speed processing of a sort operation.

However, in this processor, the sorting by the vector processor cannot be performed unless the data length of each element of vector data to be sorted is constant as determined by the particular computer.

For example, in the above "integrated database processor", the data length of the vector elements of the vector data to be sorted must be 4-byte length or 12-byte length.

However, where the data to be sorted are names of places, they may have longer data lengths than the above constant length. For those data, the above "integrated vector processor" performs the sort not by vector processing but by scalar processing. As a result, the processing speed is low.

Accordingly, it is desired to have a sort method for sorting by vector processing data longer than the constant data length given as the data length sortable by the vector processor, and a vector processor suitable thereto.

A technique for performing vector processing for a group of symbolic data trains is disclosed in U.S. patent application Ser. No. 06/737,686 (filed on May 24, 1985), now U.S. Pat. No. 4,723,206, assigned to the present assignee. In the technique of that application, vector data having symbolic trains of a constant length as elements are generated from the group of symbolic data trains, and each group of vector elements which are to belong to the same symbolic data train is processed as a partial vector. One more vector data for representing a punctuation between the partial vectors is used. This technique specifically discloses a method for searching by vector processing a symbolic train which matches a particular symbolic train from the group of symbolic data trains, as an example of the vector processing. However, this technique does not disclose a sort method. Further, it does not disclose a method for sorting by vector processing the group of symbolic trains having longer data lengths than the data length determined by the vector processor.

SUMMARY OF THE INVENTION

Accordingly, it is an object of the present invention to provide a method for detecting by vector processing an unsorted portion of a group of data.

It is another object of the present invention to provide a vector processor which can perform such detection at a high speed.

It is a further object of the present invention to provide a method for sorting by vector processing a group of data having longer data lengths than a data length determined by a vector processor for sorting.

It is still another object of the present invention to provide a vector processor which is suitable for performing such a sort method.

The vector processor in accordance with the present invention comprises, in a vector processor for sequentially fetching vectors sorted in a memory for operation, a device for detecting the start and end of a partial area of input vectors consisting of continuous vector elements of the input vector satisfying a specific condition, a device for retaining position information of a top vector element of the partial area when the start is detected, and means for storing position information of a bottom vector element into the memory together with the retained position information of the top vector element when the end is detected.

The vector processor in accordance with the present invention has a memory for storing a first vector consisting of a plurality of vector elements and a second vector each element which consists of position information designating a partial area comprising one or a plurality of adjacent vector elements in the first vector, first and second fetch units for sequentially fetching the elements of the first and second vectors from the memory, an operation unit for performing a predetermined operation on the vector elements sequentially fetched by the first fetch unit, a device for sequentially writing the operation results sequentially generated by the operation unit into the memory, a partial area access information generator for generating fetch start position information and fetch end position information for the partial area in the first vector and write position information for the operation result, based on partial area designation information fetched by the second fetch unit, a partial area fetch position information supply for outputting the position information of the vector element fetched by the first fetch unit, in synchronism with the fetching, and a detector for detecting the end of partial area processing to detect the end of operation to the partial area by comparing the position information of the vector element in the partial area supplied by the partial area fetch position information supply and the fetch end position information supplied by the partial area access information generator. The vector elements fetched from the second vector are, supplied to the partial area access information generator, the output partial area fetch start position information is set into the first fetch unit, and the operation result write position information is set into the write circuit. Thereafter, the predetermined operation is performed to the sequentially fetched vector elements of the partial area in the first vector, and the second fetch unit is controlled each time the detector for detecting the end of processing of the partial area detects the end of processing for the partial area.

In the sort method in accordance with the present invention, a data processing unit having a data memory for storing record data elements each having a key data element to be sorted, at a constant or random address interval and a sort instruction for data having shorter element lengths than the element length of the key data element is used. For each record data element, data having a length equal to the element length sortable by the sort instruction, starting from the top of the key data element contained in the record data element is fetched as a partial key data based on the data consisting of the address information of the record data element in the memory, and for each fetched partial key data one for each record data element, the partial key data is paired with the address information of the record data element to which the partial key data belongs. A group of paired data are arranged in the memory in accordance with a vector format in which the element data are arranged at a constant address interval. The vector consisting of the paired data is sorted by the values of the partial key data included in the paired data. For the vector of the sort result, adjacent vector elements whose partial key data are equal are detected as an unsorted partial area. For the detected unsorted partial area, the key data element is referred to for the unsorted vector element in each unsorted partial area based on the record data element address information in the vector element. The partial key data which is immediately behind the previously fetched partial key data is read from the key data element to update the partial key data of the unsorted vector element. For the unsorted partial area, all of whose unsorted vector elements have been updated, the sorting and the detection of the unsorted partial area are repeatedly effected. When the unsorted partial area disappears, the sorting is completed.

In accordance with the present invention, a vector element train in a vector to be processed, which meets a specific condition, such as adjacent partial element trains having the same value can be detected at a high speed.

Further, in accordance with the present invention, a vector operation can be selectively effected for a partial vector consisting of a portion of elements at adjacent positions in the vector.

Furthermore, in accordance with the present invention, a group of keys having longer data lengths than a constant sortable data length determined by the vector processor can be sorted by the vector processing.

BRIEF DESCRIPTION OF DRAWINGS

FIG. 4 shows a process flow of the multi-sort processing, FIG. 11A shows a circuit diagram of a compaction circuit 190 used in the processor of FIG. 1, FIG. 11B shows an operation condition of a partial vector detection logic 104 of FIG. 11A.

DESCRIPTION OF THE PREFERRED EMBODIMENT

The embodiments of the present invention will now be described with reference to the drawings.

Figure 1:
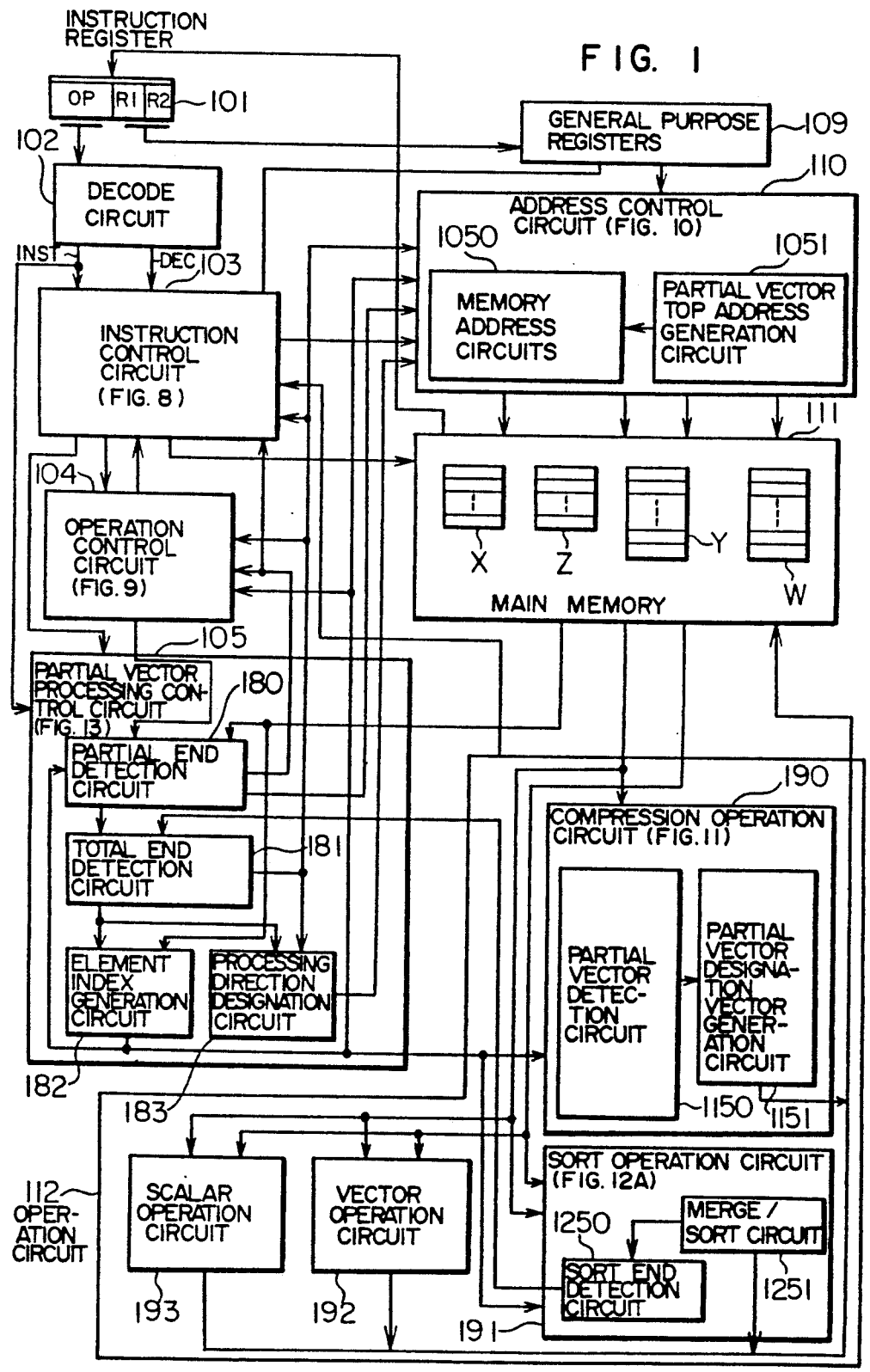
FIG. 1 shows a configuration of a vector processor in accordance with one embodiment of the present invention, FIG. 2A, in combination with FIG. 2B, shows a process flow of sort processing performed by the processor of FIG. 1.

FIG. 1 shows a vector processor in accordance with the present invention. In FIG. 1, numeral 101 denotes an instruction register, numeral 102 denotes an instruction decoder and numeral 103 denotes an instruction control circuit for controlling the execution of the decoded instruction. Numeral 104 denotes an operation control circuit which counts the number of processed vector elements where a vector instruction has been executed in order to determine if a required number of vector elements have been processed, numeral 105 denotes a partial vector processing control circuit for compaction or multi-sorting which is a characteristic feature of the present invention, and numeral 109 denotes a group of general purpose registers. Numeral 110 denotes an address control circuit for generating an address to allow writing into a main memory 111 the addresses of the elements of two vector data to be read from the main memory 111 and the vector elements resulting from the operation for those two vector elements. Numeral 112 denotes an operation circuit which includes a scalar operation circuit 193 for performing a normal scalar operation for scalar data, a vector operation circuit 192 for performing a normal arithmetic or logical operation for vector data, a sort operation circuit 191 for performing multi-sort processing to be described later for the vector data, and a compression operation circuit 190 for performing a compression operation to be described later for the vector data. Of those operation circuits, the compression operation circuit 190 is a characteristic circuit of the present invention, and the sort operation circuit 191 is characterized by the procession of an end of sort detection circuit 1250 in addition to a merge/sort circuit 1251 which is essentially similar to a known merge/sort circuit.

Figure 2B:
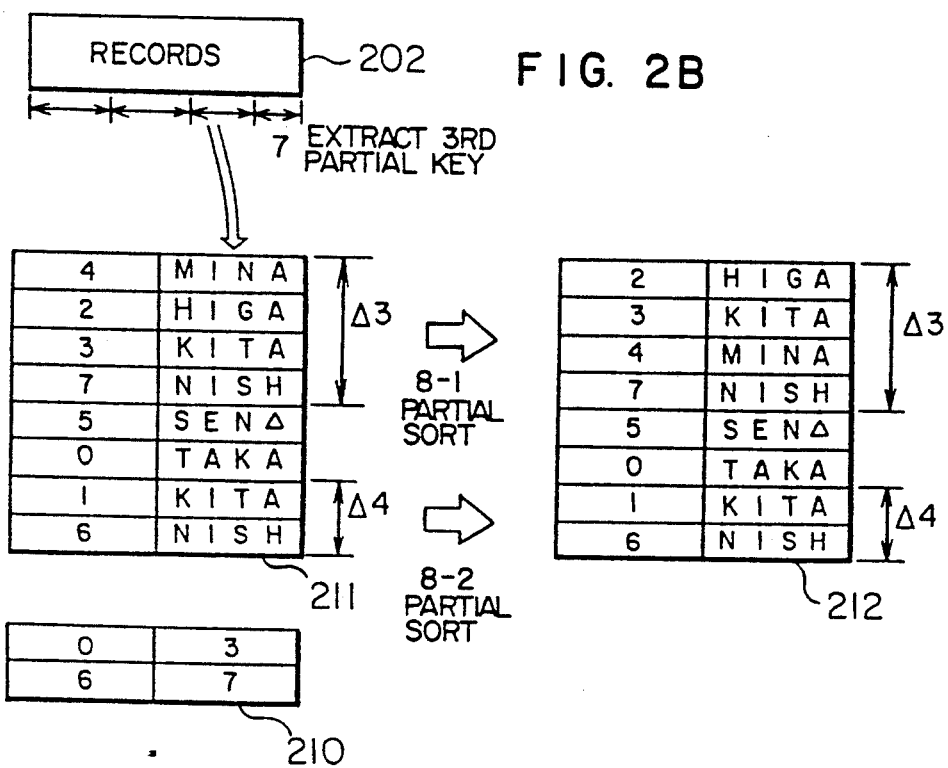

FIGS. 2A and 2B in combination show a schematic flow chart of the sort method of the present invention.

Figure 14:
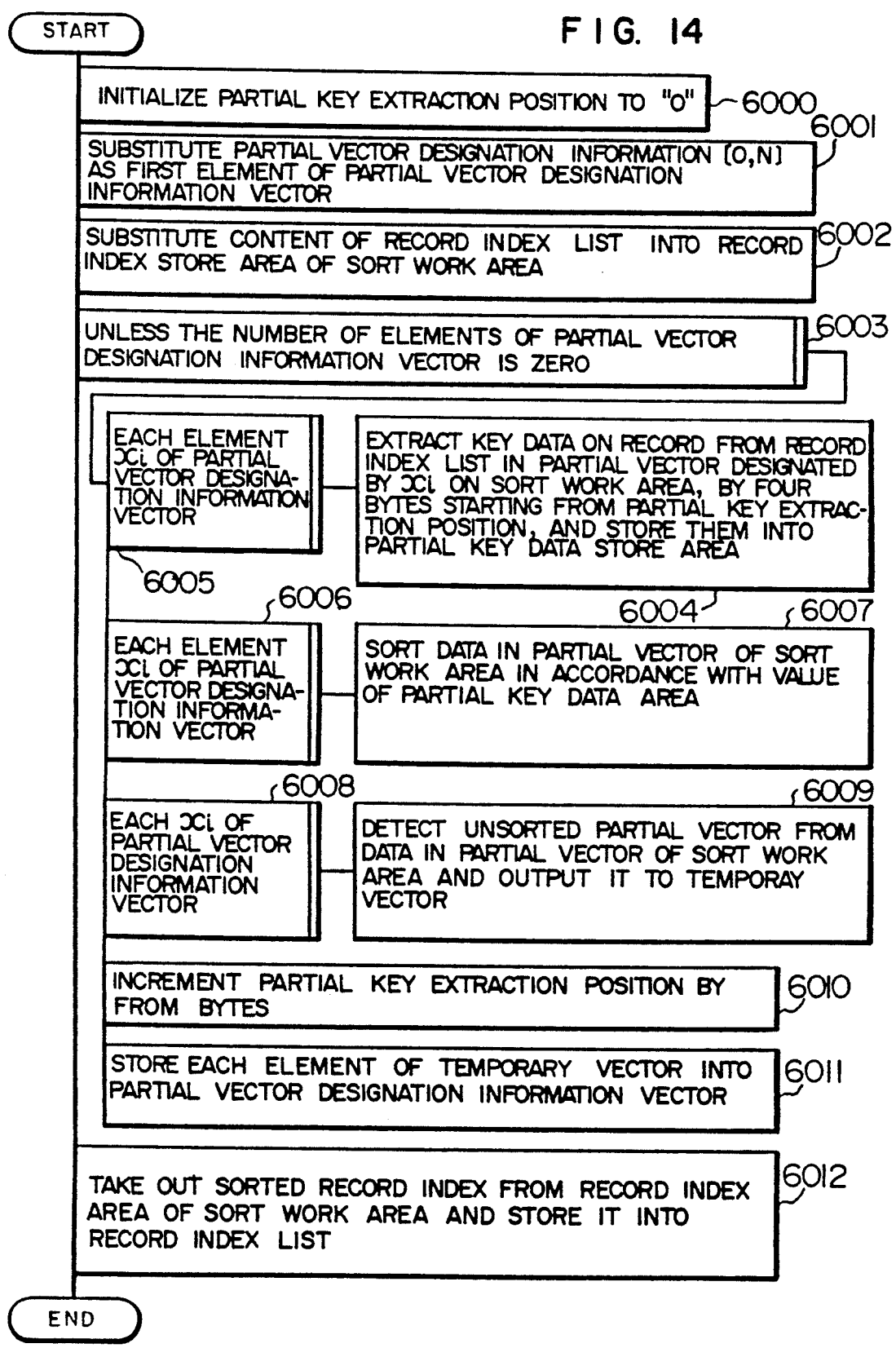
FIG. 14 shows a flow chart in a PAD form illustrating a flow of the sort processing shown in FIGS. 2A and 2B.

A sort method for fixed length keys which are subject of the present invention is described with reference to FIGS. 2A and 2B. FIG. 14 shows a flow chart in a PAD (program analysis diagram) form to illustrate the sort process flow. A group of records 202 are stored in the main memory 111. In order to simplify the explanation, it is assumed that the group of records 202 are stored as vectors in the main memory 111 at a constant address interval. A record index list 201 which consists of indices (record numbers) of the respective records are stored in the main memory 111. Each record contains data called a key (which is of 12-byte length in the present embodiment). In order to simplify the explanation, it is assumed in the present embodiment that the key is at the top of the record. In the sort processing of the fixed length keys, the record index list 201 is rearranged in accordance with the values of the keys. More specifically, in the present embodiment, the record index list 201 is rearranged so that the keys are in alphabet sequence.

It is assumed that the sort operation circuit 191 of the vector processor of FIG. 1 can sort 4-byte data by vector processing. A method for sorting by vector processing the group of records 202 each including 12-byte key, by using the vector processor is now explained.

A basic concept of the new sort method resides in sorting data having a length sortable by hardware (4-byte length in the present embodiment), which is at the top of the key, and for those records whose relative magnitudes cannot be determined by such sorting the sorting is repeated by referencing 4-byte data next to the key so that the entire record is sorted. An area for a work vector 203, each of whose elements consists of eight bytes and which has the same number of elements as the record index list 201, is prepared in the main memory 111 as a sort work area. Each element of the work vector 203 consists of two 4-byte fields. The first 4-byte area 205 is called a record index storage area, and a second 4-byte area 206 is called a partial key storage area. From each key of the group of records 202, a first partial key at the top four bytes is extracted and it is stored in the second four bytes of each element of the work vector 203. This process may be effected by a list vector instruction (VMSXEC instruction) of a conventional vector computer (for example, HITACHI "Integrated array processor of M-680H computer") and the vector operation circuit 192 of FIG. 1. Then, the elements of the record index list 201 are stored in the first four bytes of the respective elements of the work vector 203. This process may be effected by a conventional move vector instruction (VME instruction in this instance) and the vector operation circuit 192 of FIG. 1. In this manner, the data of the work vector 203 is arranged, and it is then sorted.

The sorting is effected by the sort operation circuit 191 of FIG. 1. The elements are rearranged in accordance with the values of the second 4 bytes of the respective elements of the work vector 203. In sorting, another work vector which is not shown in the drawing is used, and the sort result is supplied to the same work area as that of the work vector 203. Numeral 204 denotes the sorted work vector. For the record having the index 5, the position thereof has been defined, but the sequence of the records having the indices 4, 2, 3 and 7 is not determined because the partial keys are all "SHIN". For the records having indices 1 and 6, the sequence thereof is not determined because the partial keys are both "YOKO". Of the elements of the work vector 204, those pairs of indices and partial keys for the records for which the sorting has not yet been completed are called unsorted partial vectors. In the present instance, a partial vector $\Delta 1$ comprising elements 0 to 4 and a partial vector $\Delta 2$ comprising element 6 and element 7 are the unsorted partial vectors.

Then, the unsorted partial vectors $\Delta 1$ and $\Delta 2$ are detected from the work vector 204. This process is called a compaction process. A vector having a pair of a top element index TOP and a bottom element index BTM (hereinafter called a partial vector designation vector) of each of the partial vectors $\Delta 1$ and $\Delta 2$ of the work vector 204 is provided. In the present instance, the vector 209 consists of two elements having index pairs (0, 4) and (6, 7).

The compaction processing is effected by the compaction operation circuit 190 of FIG. 1.

The partial vectors $\Delta 1$ and $\Delta 2$ must be further sorted by referencing the remaining partial keys. Thus, the next 4-byte partial keys of the key 0 to the key 4 of the group of records 202 corresponding to the respective elements are extracted based on the record indices of the element 0 to the element 4 of the unsorted partial vector $\Delta 1$ and they are written into the partial key storage area for the elements in the unsorted partial vectors of the work vector 204. As a result, in the present instance, the value "SHIN" in the element 0 to element 4 of the work vector 204 are updated by "JUKU".

This process is performed by the above-mentioned list vector instruction and the vector operation circuit 192 (FIG. 1). The unsorted partial vector $\Delta 2$ is updated in the same manner.

As a result, a work vector 207 is generated.

The two partial vectors $\Delta 1$ and $\Delta 2$ of the work vector 207 are again sorted and the sort result is written into the positions of the partial vectors $\Delta 1$ and $\Delta 2$ of the work vector 207. Numeral 208 denotes a work vector which represents the sort result. In the illustrated instance, the vectors 207 and 208 are identical because the elements of the vector 207 have already been in the alphabetic sequence. The process of continuously sorting a plurality of partial vectors is called multi-sorting.

The multi-sorting is effected by using the partial vector designation vector 209. The partial vector $\Delta 1$ of the vector 207 is sorted by using the first element of the vector 209, and then the partial vector $\Delta 2$ of the vector 207 is sorted by using the second element of the partial vector designation vector 209. In the conventional vector processor, the multi-sorting could not be effected by one instruction but it is possible in the vector processor shown in FIG. 1.

Of the work vector 208 which is the sort result, the partial keys of the elements having indices 4, 2, 3 and 7 are equal.

The same is true for the elements having the indices 1 and 6.

The partial vector $\Delta 3$ which includes the former indices and the partial vector $\Delta 4$ which includes the latter indices are unsorted vectors. In order to detect them, the above-mentioned compression process is again effected.

Figure 3A:
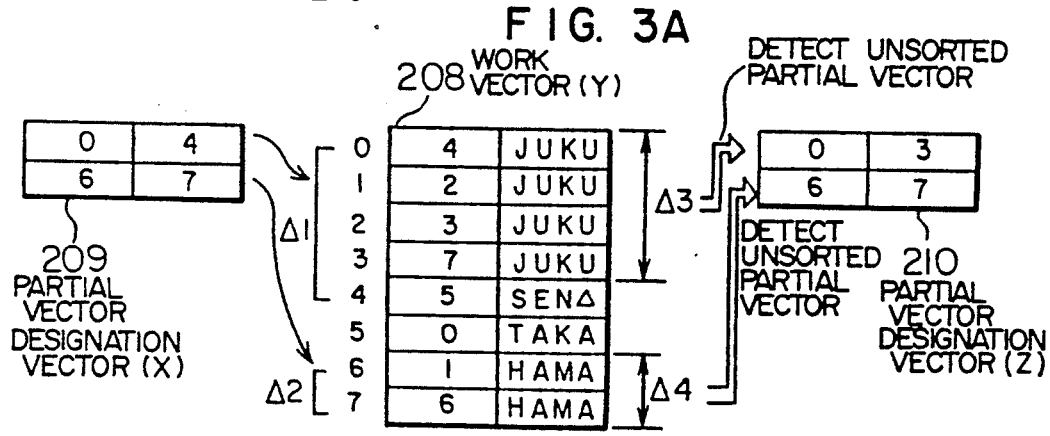
FIG. 3A shows a flow of one compression processing of the process flow of FIG. 2A.

It differs from the previous compression process in that the partial vectors Δ1 and Δ2 of the vector 208 which are designated by the partial vector designation vector 209 are individually compressed. As a result, the unsorted partial vector Δ3 is detected from the partial vector Δ1, and the partial vector Δ4 is detected from the partial vector Δ2. Further, a partial vector designation vector 210 which has element numbers of the top elements and the bottom elements of those partial vectors as elements is generated. Of the partial vector Δ1, the fourth element (5, SEN Δ) is larger than other elements 0 to 3 and hence it is not included in the unsorted partial vector Δ3. A relationship among the values of the elements in the partial vector designation vector 209, the values of the elements in the work vector 208 and the values of the elements in the partial vector designation vector 210 is shown in FIG. 3A. In the prior art vector processor, collective compression of a plurality of partial vectors could not be effected by the vector processing. The vector processor of FIG. 1 can effect the process by one instruction.

After the compression process, the vector elements contained in the partial vectors Δ3 and Δ4 of the vector 208 are updated. For the group of records 202, namely, the partial vector Δ3, the following process is effected. The record indices 4, 2, 3 and 7 contained in the elements 0 to 3 in the vector 208 designated by the first element of the partial vector designation vector 210 are read, the third partial keys of the records having those indices are read from the group of records 202, and they are written into the partial key storage areas of the elements 0 to 3 of the vector 208. The same process is effected for the partial vector Δ4.

Figure 3B:
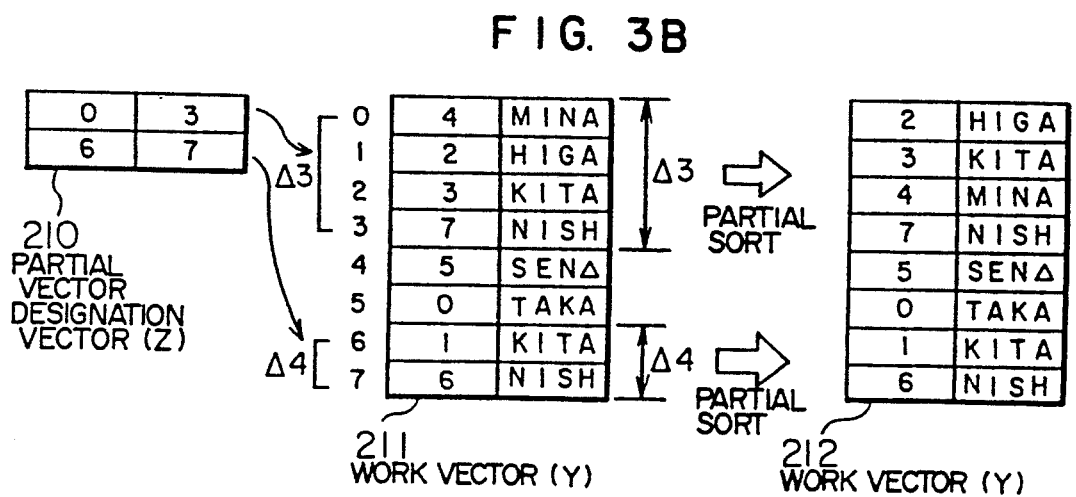
FIG. 3B shows a flow of one multi-sort processing of the process flow of FIG. 2A.

This process may be effected by repeatedly executing the list vector instruction prepared in the conventional vector processor for each of the partial vectors Δ3 and Δ4. In FIG. 2B, numeral 211 denotes a vector resulted from the above process. The above-mentioned multi-sorting is effected for the partial vectors Δ3 and Δ4 of the work vector 211 by using the partial vector designation vector 210. Numeral 212 denotes a work vector resulted from the multi-sorting. FIG. 3B shows vectors which relate to the multi-sorting. Since the partial keys contained in the unsorted partial areas Δ3 and Δ4 are different from each other, the sequence of the records is defined and the sorting is completed. The sorting is terminated when the unsorted partial vector is no longer present or the partial key to be extracted is no longer present.

The record index train in the work vector 212 represents the sort result to the group of records 202 (FIG. 2A). It is stored into the record index list 201 (FIG. 2A) by a known move vector instruction to complete the sorting.

In this manner, the sorting of the record including fixed length keys can be effected by the vector processor which has a limitation to the sortable data length.

The features of the present sort method are embodied in the following two points:

(1) A vectorization ratio is high and an acceleration factor is high.

(2) For those records whose magnitude relation has been defined by the sorting of the partial keys, no reference is made to the remaining partial keys. Accordingly, the process is efficient.

In the present embodiment, for the purpose of simplification, it is assumed that the interval of the records on the main memory is constant and the keys are included at the tops of the records. It is apparent, however, that the record interval may be arbitrary and the key need not start from the top of the record. The length of the key need not be an integer multiple of the sortable data length. (For the fraction portion of the partial key, a shift vector instruction may be used.)

The operation of the vector processor of FIG. 1 is now explained in detail. As described above, the sorting in the present invention is effected by combining conventional vector instructions (move instruction, list vector instruction, shift instruction, etc.), the compression instruction and the multi-sort instruction.

In FIG. 1, the main memory 111 stores the group of records 202 to be sorted (FIG. 2A) and the sort program (not shown). The instruction fetched from the main memory 111 is stored in the instruction register 101. When the instruction is decoded by the decoder 102, the instruction control circuit 103 sends a control signal for executing the instruction to various other circuits. The address information of the vector which is designated by the instruction and which is to be fetched from the main memory 111 for the vector processing and the vector to be written into the main memory 111 as a result of the vector processing is sent from the group of general purpose registers 109 to the address control circuit 110. The address control circuit 110 sequentially generates the addresses of the elements of the vectors to be read or written in accordance with the address information and supplies them to the main memory 111.

The vector operation circuit 192 for the conventional vector operation, the compression operation circuit 190, and the sort operation circuit 191 for multi-sorting in the operation circuit 112 are selectively activated by the instruction control circuit 103 depending on the type of instruction.

The operation results are sequentially stored in the main memory 111. The operation control circuit 104 counts the number of elements processed in the vector processing, and when all elements have been processed, it sends an end of instruction signal to the instruction control circuit 103. By repeating the above process, the program is executed. The scalar operation circuit 193 is activated by the instruction control circuit 103 in order to execute a scalar processing instruction.

The operation of the processor of FIG. 1 when the compression processing is performed is outlined for the vectors 208 and 209 shown in FIG. 3A.

In the following description of the compression processing, the partial vector designation vector 209, the work vector 208 and the partial vector designation vector 210 are called vectors X, Y and Z, respectively.

As shown in FIG. 5, the compression instruction or the multi-sort instruction used in the present embodiment includes an OP code which indicates a type of instruction and two general purpose register numbers R1 and R2. The group of general purpose registers 109 comprise 16 general purpose registers including those registers which are not shown for the purpose of simplification. They respond to the numbers R1 and R2 in the instruction to output the contents of the general purpose registers having the numbers R1, R2, R2+1 and R2+2 (hereinafter referred to as GPR (R1), GPR (R2), GPR (R2+1) and GPR (R2+2)).

The number of elements of the vector to be used as the second operand (OP, 2) is preset in the general purpose register GPR (R1), the address of the top element of the second operand vector is preset in the general purpose register GPR (R2), the address of the top element of the vector to be used as the third operand is preset in the general purpose register GPR (R2+1), and the address of the top element of the vector to be used as the first operand is preset in the general purpose register GPR (R2+2).

Figures 5A, 5B:
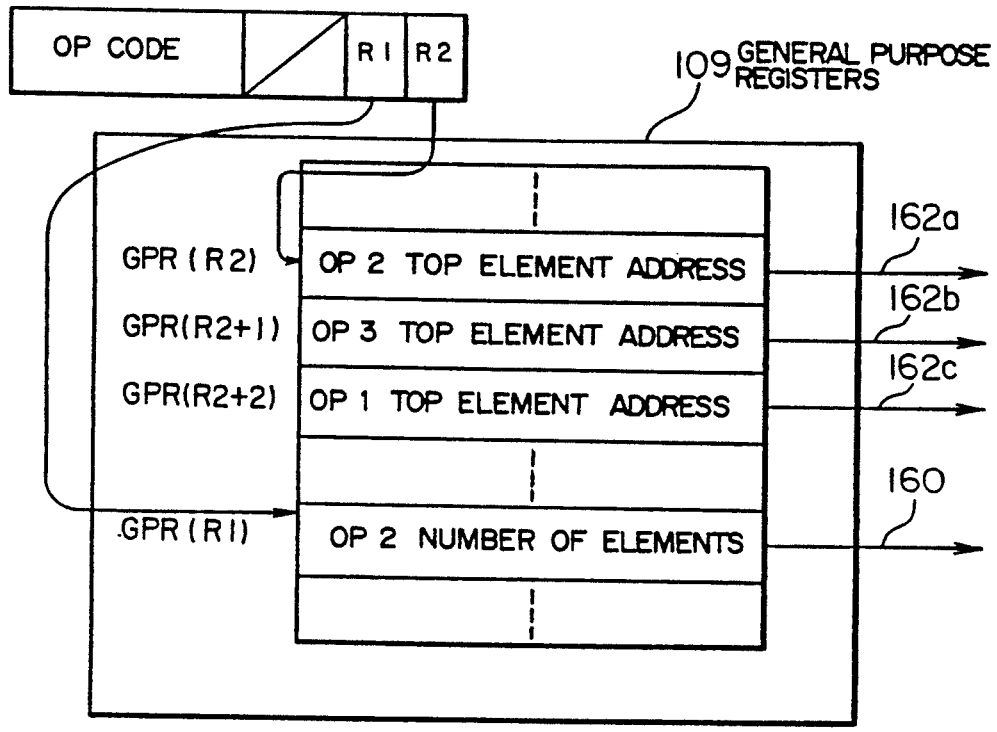
FIG. 5A shows a format of an instruction used in the vector processor of FIG. 1 and data in a general purpose register designated by the instruction.
FIG. 5B shows data or address in the general purpose register when the compaction of FIG. 3A and the multi-sorting of FIG. 3B are performed, FIG. 6A, in combination with FIG. 6B, shows a time chart for the compaction processing.

When the compression instruction to start the compression processing of FIG. 3A is to be executed, the vectors X, Y and Z are used as the second, third and first operands, respectively. Accordingly, prior to the execution of this instruction, the data or addresses shown in the column of the compression instruction in FIG. 5B are preset in the general purpose registers GPR (R1), GPR (R2) GPR (R2+1) and GPR (R2+2).

When the compression instruction is set in the instruction register 101 and decoded by the decoder 102, the instruction control circuit 103 sets the number of elements of the vector X (2 in this instance) from the group of general purpose registers 109 to the operation control circuit 104, and sends the addresses of the top elements of the vectors X, Y and Z to the address control circuit 110. The element 0 (0, 4) of the vector X is first fetched from the main memory 111 by the address control circuit 110 and it is sent to the partial vector processing control circuit 105. The element index generation circuit 182 in the partial vector processing control circuit 105 takes out the index TOP (0 in this instance) of the top element of the partial vector $\Delta 1$ in the vector Y, of the element 0 of the input vector X, and sends it to the address control circuit 110 and the operation control circuit 104. It also takes out the index BTM (4 in this instance) of the bottom element of the partial vector $\Delta 1$, and sends it to the compression operation circuit 190. The address control circuit 110 sequentially sends the addresses of the elements of the partial vector $\Delta 1$ to the main storage 111 in accordance with the input index TOP of the top element of $\Delta 1$ and the address of the top element of the vector Y. The instruction control circuit 103 sends the fetch request signal to the main storage 111 in synchronism therewith to instruct the fetching of those elements. When the fetching of the partial vector $\Delta 1$ of the vector Y is started, the instruction control circuit 103 stops the fetching of the next element of the vector X until the following process to the partial vector $\Delta 1$ is terminated. The elements of the partial vector $\Delta 1$ sequentially fetched from the main memory 111 are sent to the compression operation circuit 190 in the operation circuit 112. The compression operation circuit 190 compares adjacent ones of the vector elements sequentially received by the partial vector detection circuit. If they are equal, the first element of the vector $\Delta 1$, for example, is read, and when it is detected that it is equal to the element 0, the partial vector detection circuit 1150 determines the start of detection of the unsorted partial vector ($\Delta 3$ in the present instance).

The compression operation circuit 190 does nothing until the element of different value is fetched (until the element 4 is fetched in the present instance). Since "SEN $\Delta$" of the element 4 is different from "JUKU" of the element 3, the partial vector detection circuit 1150 determines the end of detection of the unsorted partial vector ($=\Delta 3$) when the element 4 is fetched, and sends the pair (0, 3) of the index "0" of the top element of the detected partial vector $\Delta 3$ and the index "3" which is one ahead of the index ("4" in the present instance) of the current element outputted by the operation control circuit 104, to the main memory 111, and stores it therein as the element 1 of the vector Z.

On the other hand, the operation control circuit 104 increments the index of the vector element under processing by one each time one element of the vector is processed by the compression operation circuit 190. The index is sequentially reported to the partial end detection circuit 180 in the partial vector processing control circuit 105. When the element 4 in the partial vector $\Delta 1$ is processed and the index of the element under processing in the vector Y reaches "5", it has exceeded the index BTM ($=4$) of the bottom element of $\Delta 1$. Thus, the partial end detection circuit 180 detects the end of processing of the partial vector $\Delta 1$ and sends the partial processing signal to the total end detection circuit 181. In response to this signal, the total end detection signal 181 does not effect any process but sends the total process end signal to the instruction control circuit 103 if the decoded instruction is the compression instruction. When the instruction control circuit 103 receives the process end signal for the partial vector $\Delta 1$, it issues a fetch request signal to the suppressed next element of the vector X and fetches from the main memory 111 the next element (6, 7) of the vector X which designates the next partial vector $\Delta 2$ of the vector Y. The same process is performed to the partial vector $\Delta 2$. When the elements of the vector X have been exhausted, the execution of the compression instruction is terminated.

In the present vector processor, the next element of the vector X which designates the next partial vector of the vector Y is fetched each time the processing of the partial vector of the vector Y is over. Accordingly, a plurality of partial vectors $\Delta 1$ and $\Delta 2$ can be continuously processed. Therefore, a longer vector length can be secured than when the vector processing is performed for each partial vector.

The operation of the vector processor of FIG. 1 when the multi-sort instruction is executed is outlined for the vector data shown in FIG. 3B.

In the following description of the multi-sort processing, the partial vector designation vector 210 and the vector 211 to be sorted are called vectors Z and Y, respectively. In the following process, the area of the vector W which is of the same type as the vector Y is used as a work area in the main memory 111 as shown in FIG. 1. In the multi-sort processing, the first partial vector ($\Delta 3$) of the vector Y which is designated by the top element number TOP ($=0$) designated by the top element of the vector Z and the bottom element number BTM ($=4$) is sorted. Then, the partial vector ($\Delta 4$) of the vector Y which is designated by the next element of the vector Z is sorted.

In order to sort the partial vectors, the element index generation circuit 182 and the address control circuit 110 fetch the vector element to be sorted, in the partial vector (for example, $\Delta 3$) in response to the element of the vector Z.

FIG. 4 shows the procedure of the execution of the multi-sort processing of FIG. 3B in detail. In this sort method, the vector to be sorted (the partial vector $\Delta 3$ in the present instance) is divided into two partial vectors, which are sorted by the sort process 401 to produce a vector W, and then the vector W is processed by a similar sort process 402. After the sorting process for the vector Δ3, similar processes 403 and 404 are performed for the vector Δ4. In the drawing, F and S indicate the fetching of the vector to be sorted and the storing of the vector which represents the sort result, respectively. An arrow indicates a range of the vector element to be read or written. The merge/sort processes 401 to 404 per se, the sorting of one vector by repeatedly performing the above processes and the alternate use of the vectors Y and W as the subject of the sorting and the sort result storage vector are same as those disclosed in U.S. patent application Ser. No. 685,116 (field on Dec. 21, 1984) assigned to the present assignee. In the prior art, the number of times of repetition of the merge/sort process 401 is constant determined by the number of data to be sorted, irrespective of the end of sorting. In the present embodiment, the merge/sort process 401 is repeatedly performed as long as the sorting is not completed, and the repetition is stopped upon completion of the sorting.

In the instance of FIG. 4, the merge/sort process 401 uses the vector Y as the vector to be sorted, and the vector W as the sort result storage vector. The merge/sort process 402 uses the vector W as the vector to be sorted and the vector Y as the sort result storage vector. In this case, the sorting is completed in one time reversal use.

The present embodiment is characterized in general by the fact that the merge/sort processes 401 and 402 are continued until the sorting of the partial vector Δ3 is terminated. To this end, the present embodiment adopts the following two circuits.

First, in FIG. 1, a sort end detection circuit 1250 for determining whether the sorting has been terminated or not each time the merge/sort process 401 of the partial vector is completed one time is provided in the sort operation circuit 197.

The total end detection circuit 181 which is the second characteristic circuit ANDs the partial end signal indicating the end of one time merge/sort process (for example, the process 401 or 402) from the partial end detection circuit 180 and the detection signal indicating whether it was sorted or not in order to determine whether the next partial vector is to be fetched or the merge/sort process is to be repeated for the same partial vector.

Where the merge/sort process is to be repeated for the same partial vector, it is effected by exchanging the vector to be sorted and the sort result storage vector by switching the fetch address and the vector store address in the address control circuit 110. In the instance of FIG. 4, since the indices of the top element of the partial vector Z are "0" and "3", the four elements, elements 0 to 3 of the vector Y are first fetched as the subject to be sorted.

On the other hand, the result is stored into the result storage vector W, starting from the top element. To this end, the element index generation circuit 182 sends the indices "0" and "3" of the top element of the vector Z to the address control circuit 110. The partial vector address generation circuit 1051 in the address control circuit 110 generates the addresses of the elements 0 and 2 of the vector Y and the addresses of the elements 0 and 2 of the vector W as the fetch top addresses, and the address of the element 0 of the vector Y and the address of the element 0 of the vector W as the store top address in accordance with those three indices. The generated addresses are held in the partial vector address generation circuit 1051 and also sent to the memory address circuits 1050. Based on those addresses, the memory address circuits 1050 in the address control circuit 110 fetch the partial vector starting from the element 0 of the vector Y and the partial vector starting from the vector element 2 of the vector Y from the main memory 111 as the vectors to be sorted, and sequentially writes the sort results starting from the position of the top element of the vector W. In this manner, the merge/sort process 401 is performed, and at the end of the process, the partial end detection circuit 180 sends out the partial end signal for the partial vector Δ3. In the instance of FIG. 3B, the total end detection circuit 181 produces a signal indicating that the sorting has not been completed. The memory address circuits 1050 determine the addresses of the elements 0 and 2 of the vector W as the addresses of the vectors to be fetched, and fetch the partial vector starting at the element 0 of the vector W and the partial vector starting at the element 2 of the vector W. The also determine the address of the element 0 of the vector Y as the store top address and store the result vector of the merge/sort process 402 for those two partial vectors in the positions of the elements 0 to 4 of the vector Y.

At the end of the merge/sort process 402, the partial vector Δ3 of the vector Y has been totally sorted and the total end detection circuit 181 sends the signal indicating the completion of the sort process of the partial vector Δ3 to the instruction control circuit 103, and the address control circuit 110 responds to the signal from the instruction control circuit 103 to fetch the next elements (6, 7) of the next partial vector Δ4 from the vector Z. Similarly, the sorting is performed for the partial vector Δ4 of the vector Y.

In this manner, in accordance with the present invention, the partial vectors Δ3 and Δ4 are collectively and continuously processed by the vector processing. In the prior art vector processor (for example, built in data processor of HITACHI M680 H), the sort instruction must be executed for each partial vector. (In the instance of FIG. 4, the built-in data processor of M680 H must issue the M SORT instruction four times). Accordingly, where the number of elements of the partial vector is small, the overhead for starting the vector instruction is large. The present invention does not pose such a problem.

The operation of the processor of FIG. 1 when the compression instruction is executed is now explained in detail for the vectors X, Y and Z shown in FIG. 3. In the following description, the reference numbers applied to the signal lines and shown in the drawing are not quoted although like reference numerals denote like signal lines.

Figure 6A:
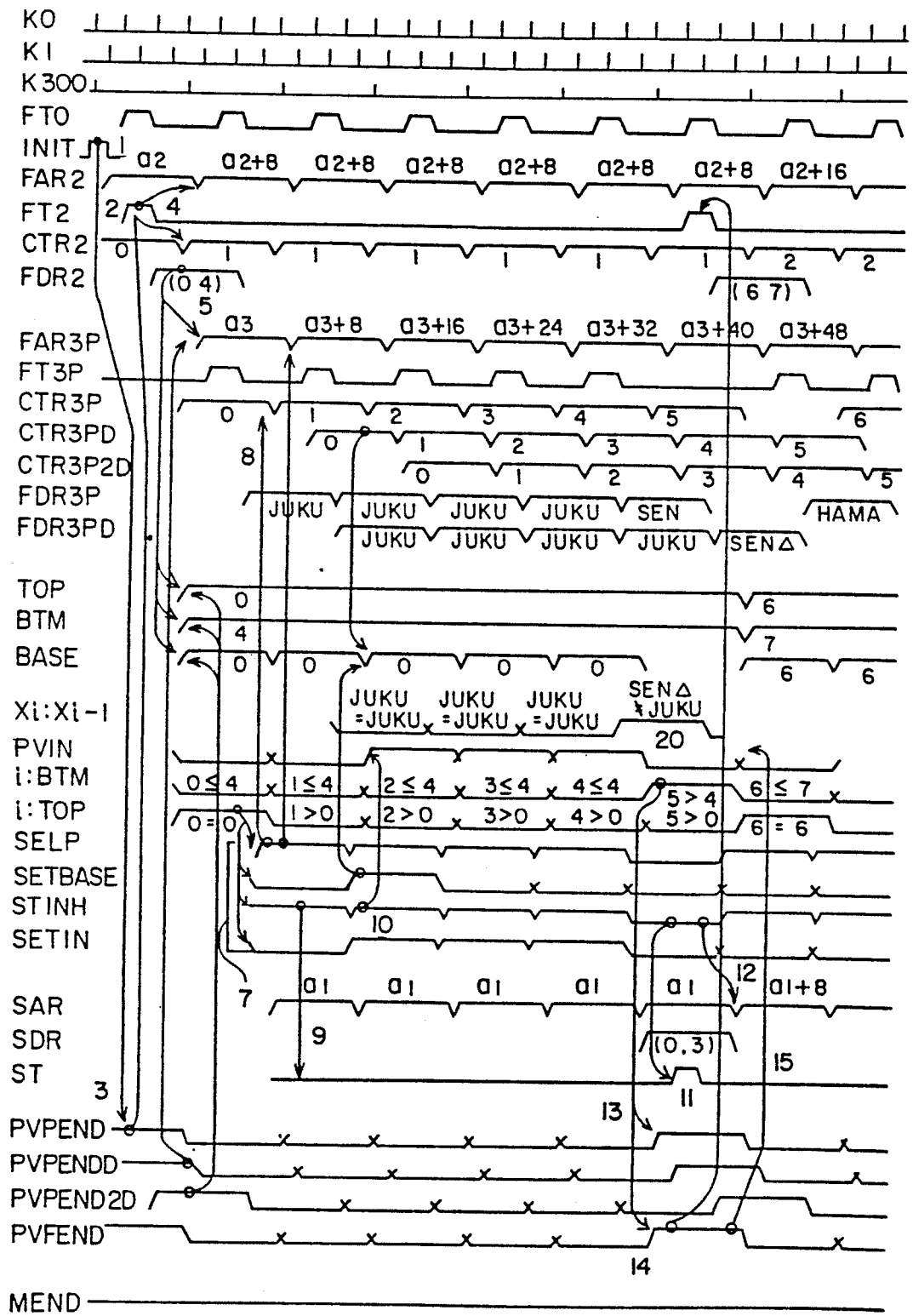
Figure 6B:
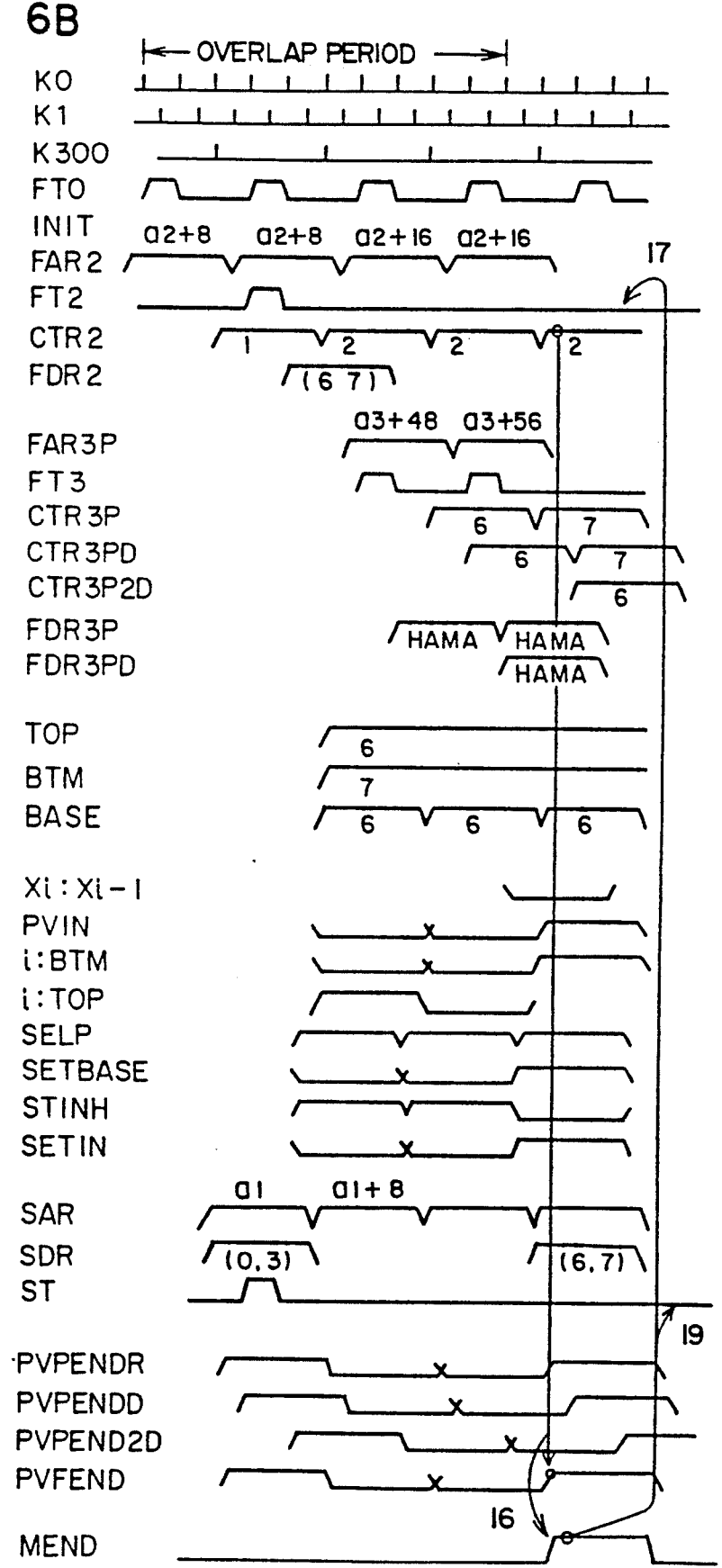

FIGS. 6A and 6B show timing charts for illustrating the operation of the vector processor of FIG. 1 when the compression process of FIG. 3A is performed. In the present vector processor, clocks $K_0$ and $K_1$ are used as basic machine clock signals. The "overlap" period shown at the top in FIG. 6B overlaps with a portion of FIG. 6A. When the compression instruction or the multi-sort instruction is detected in the decoding of the vector instruction in the format of FIG. 5 read from the instruction register 101, a signal DEC indicating the detection and a signal INST indicating whether it is the compression instruction or the multi-sort instruction are sent to the instruction control circuit 103. If it is the compression instruction, the content of INST is "0", and if it is the multi-sort instruction, the content of the signal INST is "1".

Figure 8:
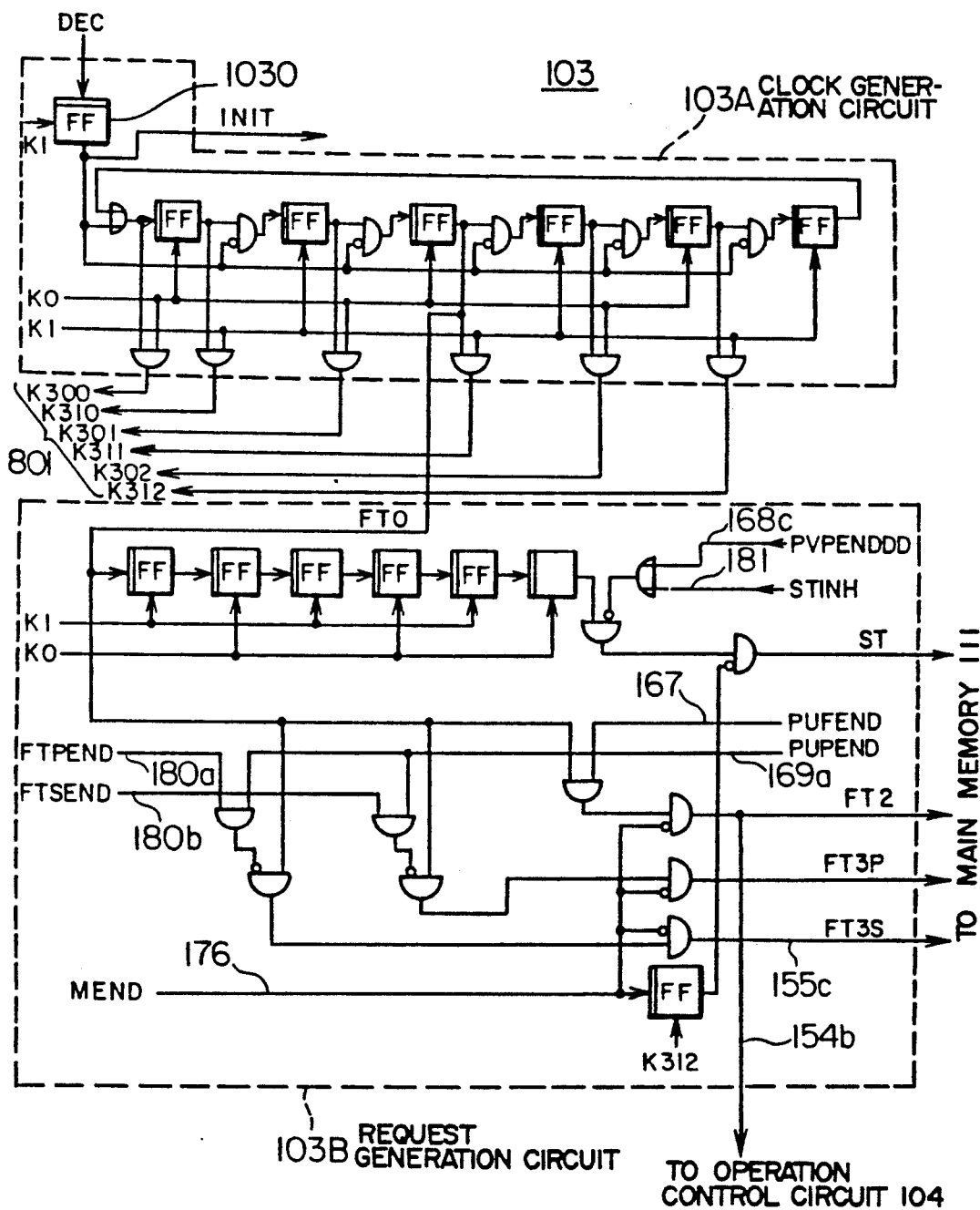
FIG. 8 shows a circuit diagram of an instruction control circuit 103 used in the processor of FIG. 1, FIGS. 9A and 9B show circuit diagrams of an operation control circuit 104 used in the processor of FIG. 1.

A configuration of a portion of the instruction control circuit 103 which relates to the execution of the compression instruction and the multi-sort instruction is shown in FIG. 8. This circuit comprises a clock generation circuit 103A for generating an initialization signal INIT AND CLOCK SIGNALS K300, K310, K301, K311, K302 and K312, and a request generation circuit 103B for generating vector element fetch request signals FT2, FT3P, FT3S and vector element store request signal ST to be supplied to the main memory 111. In the drawing, FF denotes a flip-flop. The same is true in other drawings.

A basic signal FT0 which is a basis for fetch or store operation rises 1.5 clocks after the initialization signal INIT and thereafter remains "1" for one clock period at every three clocks. The fetch request signals FT2, FT3 and FT3S and the store request signal ST are generated by appropriately masking the basic signal FT0. The fetch request signal FT3S is not used in the execution of the compression instruction. The 3-clock period signal K300 is generated in synchronism with the rises of the initialization signal INIT and the clock K0, and the 3-clock period signals K310, K301, K311, K302 and K312 are generated with the shift of 0.5 clock period, respectively, and they are supplied to the respective circuits.

Figure 10:
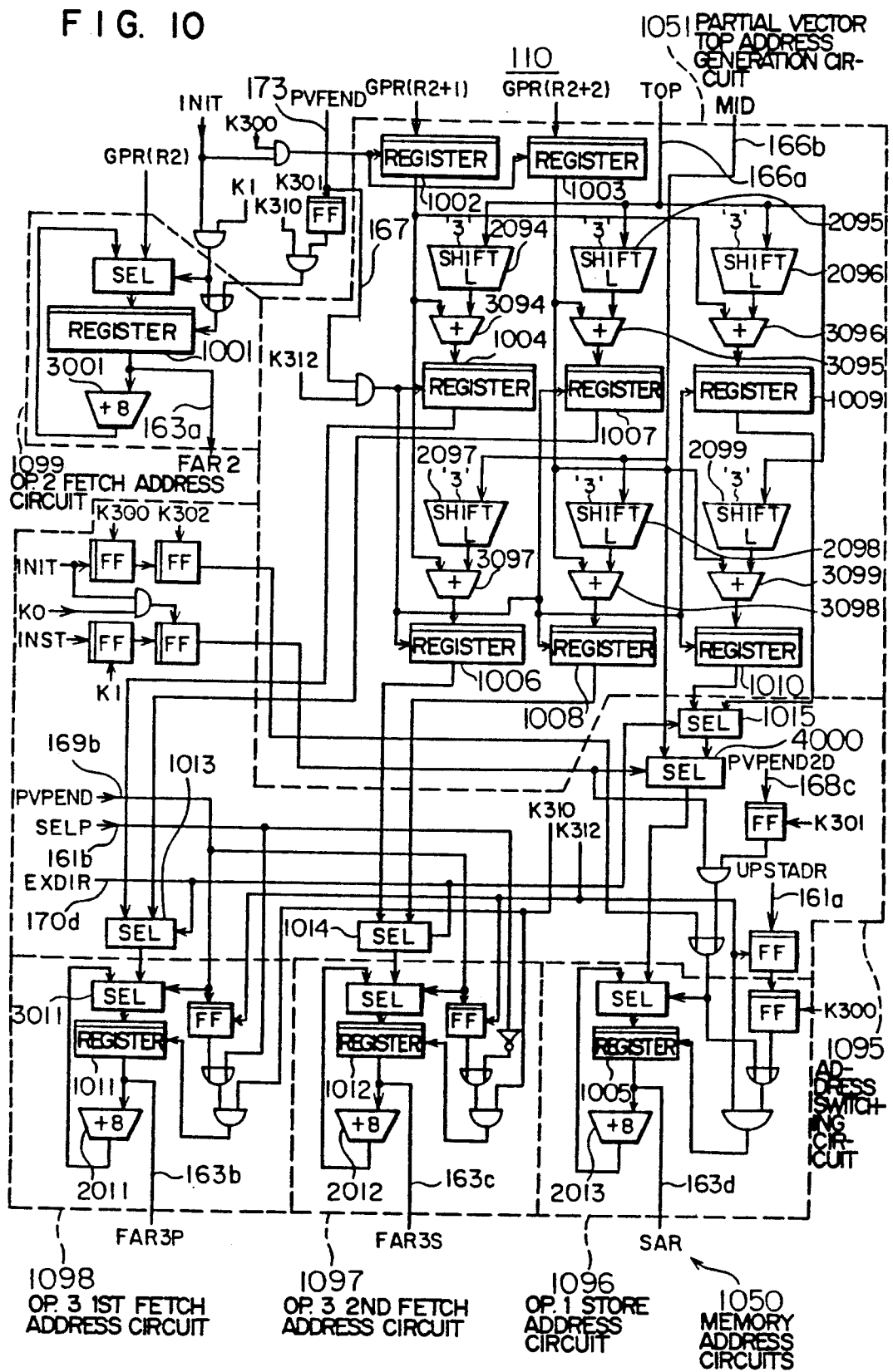
FIG. 10 shows a circuit diagram of an address control circuit 110 used in the processor of FIG. 1.

FIG. 10 shows a configuration of the address control circuit 110. The address control circuit 110 includes memory address circuits 1050 which comprises an OP. 2 fetch address circuit 1099 for generating the address of the element of the vector to be used as the second operand for fetching the vector, an OP. 3 first fetch address circuit 1098 for generating the address of the element of the vector to be used as the third operand for fetching the vector, an OP. 3 second fetch address circuit 1099, and an OP. 1 store address circuit 1096 for generating the address of the element of the vector to be used as the first operand for storing the vector.

The OP. 2 fetch address circuit 1099 sequentially generates the addresses of the succeeding elements based on the address of the top element supplied from the general purpose register GPR (R2), and the other address circuits 1096 to 1098 generate the addresses of the succeeding vector elements based on the address of the top element supplied from the partial vector top address generation circuit 1051. Numeral 1095 denotes an address switching circuit for selectively supplying the generated addresses to the address circuits 1096 to 1098. In the compression process shown in FIG. 3A, each time the total end signal PVFEND is supplied from the total end detection circuit 181, the OP. 2 fetch address circuit 1099 increments the content of the register 1001 in which the top element of the vector X supplied from the general purpose register GPR (R2) is set, by eight by the +8 adder 3001, and sets the result into the register 1001 through the selector SEL. In this manner, the addresses of the elements of the vector X are sequentially generated starting from the top element. The partial vector top address generation circuit 1051 calculates the address of the top element of the partial vector (for example, Δ1) of the vector Y designated by the element of the vector X fetched from the main memory, by the function of the OP. 2 fetch address circuit 1099, and the address switching circuit 1095 supplies it to the OP. 3 first fetch address circuit 1098. After the address circuit 1098 has held the top element address in the register 1011, it increments the address by eight at a time to sequentially generate the addresses of the elements of the vector Δ1 of the vector Y, and supplies then to the main memory 111 to fetch the partial vector Δ1. This address updating is effected by using the +8 adder 2011 and the selector SEL in response to the signal SELP supplied from the compression operation circuit 190 for each processing of one vector element.

On the other hand, the address switching circuit 1095 selects the address of the top element of the vector Z supplied from the general purpose register GPR (R2+2), by the selector 4000, and supplies it to the OP. 1 store address circuit 1096. The OP. 1 store address circuit 1096 takes the address into the register 1005 and outputs it as the address SAR for writing the compression result of the partial vector Δ1. Similarly, it writes the compression result of the partial vector Δ2 into the next element position of the vector Z. The updating of the store address is effected by using the +8 adder 2013 and the selector SEL in response to the signal UP-STADR produced each time the compression process for one partial vector is completed in the compression operation circuit 190.

Details of the operations of those circuits are described herein later.

FIG. 4 shows a detail of the operation control circuit 104.

Numeral 952 denotes an OP. 2 execution element counter which produces the index of the element of the vector used in the OP. 2 fetch address circuit 1099 in the address control circuit 110 as the second operand, in synchronism with the generation of the address of the vector element.

Numerals 950 and 951 denote OP. 3 first execution element counter and OP. 3 second execution element counter which generate the indices of the elements under process in association with the OP. 3 first fetch address circuit 1098 and the OP. 3 second fetch address circuit 1097, respectively.

The counters 950, 951 and 952 include registers 901, 904 and 902, respectively, and +1 address for incrementing the contents by one.

Numeral 953 denotes an end of instruction detection circuit which determines whether all elements of the vector designated as the second operand (vector X in the present instance) have been processed.

The end of process is determined by comparing by the comparator 904 the total number of vector elements of the second operand and the index given by the OP. 2 execution element counter 952.

Figure 13:
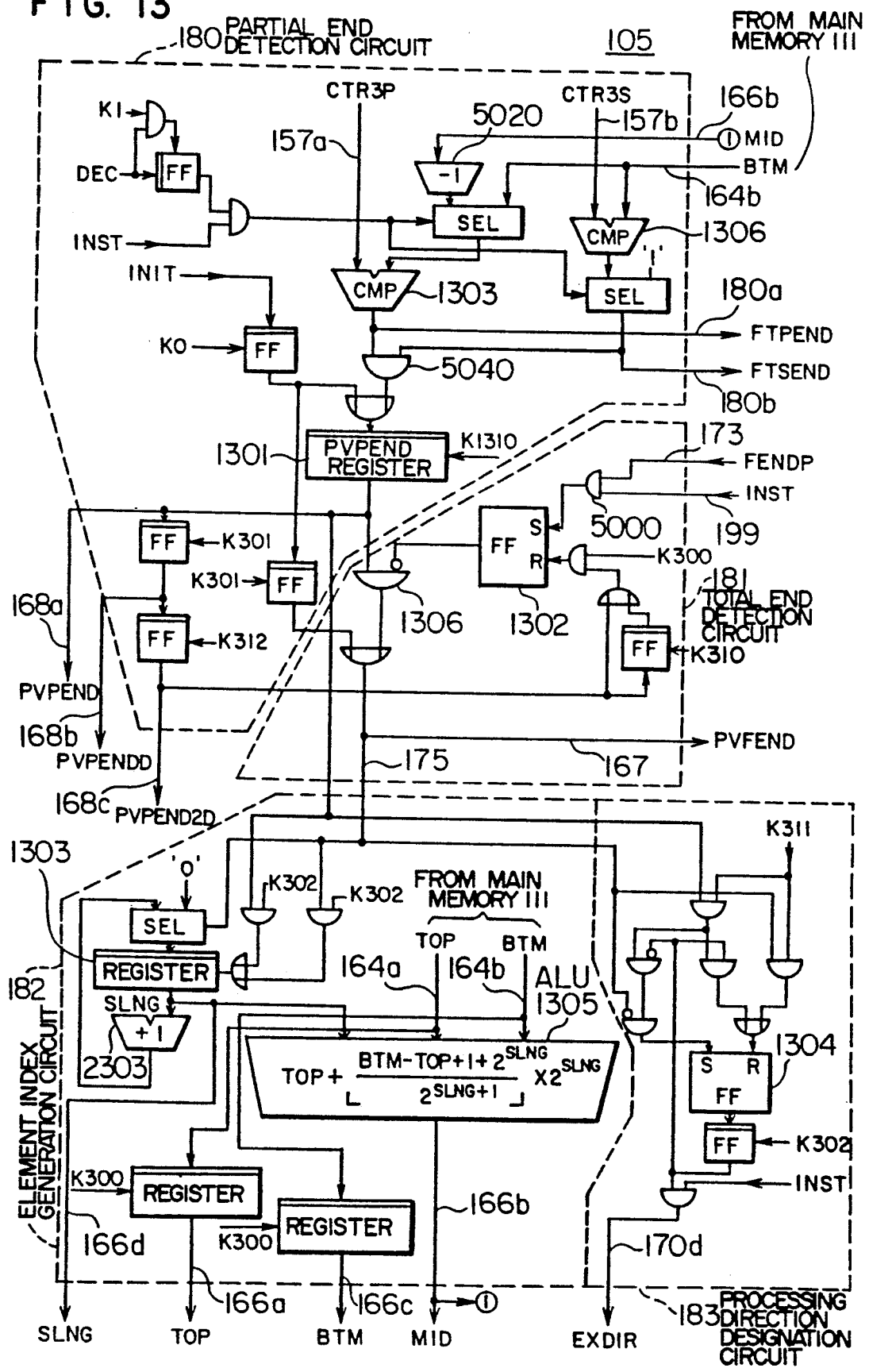
FIG. 13 shows a circuit diagram of a partial vector processing control circuit used in the processor of FIG. 1.

The configuration of the partial vector processing control circuit 105 is shown in FIG. 13.

The partial end detection circuit 180 detects whether the processing for the partial vector to be used as the third operand has been completed or not for each partial vector. When the partial vector processing has been completed, it sets "1" in the register 1301.

In the compression processing, the end of the partial vector processing is detected when the processing for all elements of one partial vector to be compressed (for example, the partial vector Δ1 of the vector Y) has been completed. The total end detection circuit 181 is primarily for the multi-sort processing. In the compression processing, it responds to the output PVPEND of the register 1301 to produce the partial vector fetch end signal PVFEND.

The element index generation circuit 182 is primarily used for the multi-sort processing. In the compression processing, it provides the index TOP of the top element of the partial vector to be compressed (for example, the partial vector Δ1 of the vector Y) included in the element of the vector X fetched from the main memory 111, to the address control circuit 110, the operation control circuit 104 and the compression operation circuit 190, and also sends the index BTM of the bottom element which is simultaneously read, to the compression operation circuit 190.

Numeral 183 denotes a processing direction designation circuit used in the multi-sort processing. This circuit will be described later in connection with the multi-sort processing.

FIG. 11A shows a configuration of the compression operation circuit 190. In the partial vector detection circuit 1150, numeral 1106 denotes a comparator for comparing a preceding element and a succeeding element of the vector Y, numerals 1102 and 1107 denote comparators for comparing the index CTR3P of the element number of the partial vector Y under processing with the index TOP of the top element number and the index BTM of the bottom element number of the partial vector to be processed, respectively, and numeral 1104 denotes a partial vector detection logic for detecting whether an unsorted partial vector exists in the partial vector under processing, in response to the outputs of the comparators 1106, 1102 and 1107.

The partial vector designation vector generation circuit 1151 generates the vector Z to be outputted as the result of the compression processing from the index CTR3P for the element of the vector Y under processing in response to the output of the partial vector detection circuit 1104.

When the instruction control circuit 103 (FIG. 8) receives the DEC signal, it sends the output of the flip-flop 1030 to the address control circuit 110, the operation control circuit 104 and the partial vector processing control circuit 105, as the signal INIT for instructing the initialization.

In the address control circuit 110 (FIG. 10), in response to the initialization signal INIT sent from the instruction control circuit 103, the top element address (a2 in FIGS. 6A and 6B) of the vector X stored in the general purpose register GPR (R2) is set into the address register 1001 in the OP. 2 fetch address circuit 1099 through the selector SEL. Similarly, the top element address (a3, a1) of the vectors Y and Z supplied from the general purpose registers GPR (R2+1) and GPR (R2+2) are set into the address registers 1002 and 1003 in the partial vector address generation circuit 1051 (①) in FIG. 6A).

In the operation control circuit 104 (FIG. 9), "0" is set into the count register 902 in the OP. 2 execution element counter 952 through the selector SEL under the control of the initialization signal INIT sent from the instruction control circuit 103. Further, the number of elements of the vector X stored in the general purpose register GPR (R1) is set into the second operand element count register 903 in the instruction end detection circuit 953, in response to the initialization signal INIT.

In the partial vector processing control circuit 105 (FIG. 13), "1" is unconditionally set into the partial processing end register (PVPEND register) 1301 in response to the initialization signal INIT sent from the instruction control circuit 103, and then the partial processing end signal PVPEND is kept high over three machine cycles (③ in FIG. 6A).

Thus, the initialization process is completed.

Since the initialization has been completed, the fetching of the top element of the vector X and the compression process are started. The instruction control circuit 103 (FIG. 8) sends the fetch request signal FT2 for the vector X to the main memory 111 after the initialization signal INIT has been outputted. Since the output of the OP. 2 fetch address circuit 1099 of the address control circuit (FIG. 10) is now the top element address of the vector X, the top element (0, 4) of the vector X is fetched from the main memory 111 as the fetch data FDR2. The front half of the element represents the index TOP of the top element of the partial vector Δ1 of the vector Y to be compressed, and the rear half represents the index BTM of the bottom element of the same partial vector. The indices TOP and BTM are sent to the element index generation circuit 182 of the partial vector processing control circuit (FIG. 13).

The element index generation circuit 182 transfers the top element index TOP ("0" in the present instance) to the address control circuit 110, the operation control circuit 104 and the compression operation circuit 190. The bottom element index BTM is also sent to the compression operation circuit 190. The data address control circuit 110 (FIG. 10) is shifted left by three bits by the shifter 2094 in order to multiply the input index TOP by the vector element length (eight bytes). It is added to the top address (a3) of the vector Y held in the register 1002 by the adder 3094. In this manner, the address of the top element of the partial vector Δ1 is calculated. This address is set into the register 1004. The top element address of the partial vector Δ1 set in the register 1004 is then set into the register 1011 in the OP. 3 first fetch address circuit 1098 through the selector 1013 (⑤ in FIG. 6A).

The output FAR2 of the OP. 2 fetch address circuit 1099 and the count CRT2 of the OP. 2 execution address element counter 952 in the operation control circuit (FIG. 9) are now updated in preparation to the fetching of the next element of the vector X (FIG. 6A ④).

On the other hand, in the operation control circuit 104 (FIG. 9), the input index TOP is set into the register 901 through the selector SEL as the initial value in response to the partial vector processing end signal PVPENDD supplied from the partial end detection circuit 181 (FIG. 13).

On the other hand, the instruction control circuit 103 starts to send the fetch request FT3P for the vector Y to the main memory 111 at every three clocks after the fetch request signal FT2 for the vector X has been issued (⑥ in FIG. 6A).

In response to the fetch request FT3P, the main memory 111 outputs the elements of the partial vector Δ1 of the vector Y in accordance with the fetch address FAR3P from the OP. 3 first fetch address circuit 1098. In this manner, the elements of the partial vector Δ1 of the vector Y are sequentially fetched. Those elements are compressed in the following manner.

In the compression processing, the elements having equal rear-half four bytes of the vector elements (eight-byte length) are detected.

The elements of the partial vector Δ1 are sequentially supplied to the compression operation circuit 190 (FIG. 11A) as the fetch data FDR3P, and they are supplied to the comparator 1106. The comparator 1106 compares the element FDR3PD which has been previously read and set in the register 1101 with the newly read element FDR3P. For the element 0 of the partial vector Δ1, no comparison is made because there is no previous vector element. In order to determine whether the partial vector element which has been read is the top element of the partial vector or not, the comparator 1102 compares the index CTR3P supplied from the OP. 3 first execution element counter 950 of the operation control circuit (FIG. 9) with the index TOP ("0" in the present instance) of the top vector element of the partial vector Δ1 supplied from the element index generation circuit 182 (FIG. 13), and supplies the comparison result to the partial vector detection logic 1104. If the newly fetched element FDR3P is the element 0 of the partial vector Δ1, the output of the comparator 1102 is "=" and the item number 5 of FIG. 11B is selected. Thus, only the control signals SELP and STINH are produced and the signals SETBASE, SETIN and SELSTD are not produced (⑦ in FIG. 6).

The control signal SELP is sent to the address control circuit 110 (FIG. 10) and the operation control circuit 104 (FIG. 9) to instruct the updating of the address and the index to the OP. 3 fetch address circuit 1098 and the OP. 3 first execution element counter 950 in preparation for the fetching of the next element of the partial vector Δ1 (⑧ in FIG. 6).

The control signal STINH is sent to the instruction control circuit 103 to inhibit the generation of the store signal ST (⑨ in FIG. 6).

When the element 1 which is the second element in the partial vector Δ1 is fetched, the element 0 (4, JUKU) is latched into the register 1101 in synchronism with the fetching. The comparator 1106 compares the element 0 in the register 1101 with the newly fetched element 1. The comparison is made for the rear-half four bytes of the eight-byte length data. The comparison result (in the present instance, it is "=" because both are "JUKU") is sent to the partial vector detection logic 1104.

In response to the comparison result ("=" in the present instance) and the value PVIN ("0" in the present instance because it is not yet in the partial vector processing status) of the partial vector status register 1110, the partial vector detection logic 1104 detects the start of the unsorted partial vector. The item number 1 of FIG. 11B is selected so that the partial vector processing status set signal SETIN is rendered high and the signals SETBASE, STINH and SELP are also rendered high. As the signal SETIN is rendered high, it is set into the partial vector status register 110 through the selector SEL as the signal indicating that the element in the partial vector is under processing (⑩ in FIG. 6A).

When the signal SETBASE is rendered "1", the index TOP of the top element of the partial vector Δ1 is set into the top position register 1105 through the selector SEL (⑩ in FIG. 6A).

Subsequently, the element 2 of the partial vector Δ1 is processed in the same manner. The output of the comparator 1106 is again "1" but since the output PVIN of the register 1110 is "1", the item number 6 of FIG. 11B is selected. In this case, the signals SEIN, SELP and SINNH are high but the signal SETBASE remains "0". Thus, the content BASE of the register 1105 is not changed. The other is same as that for the item number 1.

The detection of the end position of the unsorted partial vector is now explained. Basically, when the comparator 1106 detects mismatching between the two vector elements compared thereby, it determines that the former vector element is the end element of the partial vector and stores the index.

For example, in the instance of FIG. 3A, when the element 4 (5, SEN Δ) of the partial vector Δ1 is fetched, the key therein and the key of the element 3 (7, JUKU) in the register 1101 previously fetched are compared by the comparator 1106. The mismatching is detected and it is informed to the partial vector detection logic 1104 (⑳ in FIG. 6A) As a result, the item number 3 of FIG. 11B is selected As a result, only the signal SELP is rendered "1" and others are rendered "0". The output CTR3PD of the register 1162 is now "4" and the output CTR3P2D of the register 1164 is now "3".

The registers 1161 and 1163 are for timing purpose. In the present instance, the content CTR3P2D of the register 1164 which latches the index of the element fetched previously to the currently fetched element is selected by the selector 1160 in accordance with the value "0" of the selection signal SELSTD, and the index "3" of the bottom element of the partial vector Δ3 is set into the rear-half four-byte position of the store data register 1170. For the index of the top element of the partial vector Δ3, the BASE value "0" stored in the top position register 1105 is set into the front-half four bytes of the store data register 1170. In this manner, the element 0 (0, 3) of the vector Z is generated. The register 1165 is used for timing purpose. The control signal STINH is rendered low so that the instruction control circuit 103 renders the suppressed store signal ST high (⑪ in FIG. 6A), and stores the content (0, 3) of the store data register 1170 into the main memory 111 as the element 0 of the vector Z. The storing is effected in accordance with the address designated by the OP. 1 store address circuit 1096 in the address control circuit 110.

The register 1160 is provided to comply with a special case where the element 4 of the partial vector Δ1 of FIG. 3A is, for example, (5, JUKU) which is equal to the element 3. In such a case, it is necessary to store the index of the lastly fetched element of the partial vector Δ1 as the index of the bottom element. In this case, the item number 6 of FIG. 11B is selected so that the signal SETLSTD is rendered "1" to select the content CTR3PD of the register 1162 by the selector 1160 as the index of the bottom element.

In the above description, the top element of the unsorted portion of the partial vector Δ1 is equal to the top element of the partial vector Δ1. In a case where they are not equal, it is top element of the unsorted portion is detected, the signal of the item number 1 is produced and the unsorted partial vector can be detected in a similar manner. In this case, since the index of the top element of the unsorted partial vector is given by the output CTR3PD of the signal 1162, it is selected by the selector SEL and set into the register 1105.

If there is now unsorted portion in the partial vector Δ1, it is processed in accordance with the item number 2. In this case, the element of the vector Z is not generated.

In storing the vector Z, the address supplied by the OP. 1 store address circuit 1096 is determined in the following manner.

The top address of the vector Z set into the register 1003 at the time of initialization is selected by the selector 4000 because the instruction decode signal INST is "0" for compression instruction, and it is sent to the selector SEL in the OP. 1 store address circuit 1096.

The selector SEL selects the address at the time of initialization in response to the initialization signal INIT, and the register 1005 takes it in.

Then, the address in the register 1005 is updated by eight at a time by the +8 adder 2013 and the selector SEL in response to the signal UPSTADR produced each time the element of the vector Z is written from the compression operation circuit 190.

The shifting of the partial vector area Δ2 to the compression processing is now described. The bottom element (5, SEN Δ) of the partial vector Δ1 is fetched and the end of the partial vector Δ3 is detected as described above and it is stored in the OP. 1 as the partial vector designation information (0, 3). The control signal SELP is now rendered high, and in response thereto, the count CTR3P of the OP. 3 first execution element counter 950 in the operation control circuit 104 (FIG. 9) is updated (⑳ in FIG. 6).

In parallel therewith, the compression operation circuit 190 (FIG. 11A) delays the signal STINH to generate the store address update signal UPSTADR, which is sent to the address control circuit 110 (FIG. 10). The OP. 1 store address circuit 1096 increments the store address SAR in response to the signal UPSTADR (⑫ in FIG. 6).

On the other hand, the index CTR3P produced by the OP. 3 first execution element counter 950 is sent to the partial end detection circuit 106 (FIG. 13).

In the partial end detection circuit 106, since the signal INST given by the decode circuit 102 at the time of decoding of the compression instruction is "0", the selector SEL selects the index BTM of the bottom element of the partial vector Δ1 resulting from the fetching of the element 0 of the vector X. The comparator 1303 compares the element number CTR3P with the index BTM (in the present instance, CTR3P>BTM), and the partial processing end register 1301 is rendered high in accordance with the comparison result ( ⑬ in FIG. 6A).

For the compression instruction, the partial vector processing mode register 1302 is reset to "0" because the decode signal INST is "0". Accordingly, when the partial processing end signal PVPEND which is the output of the register 1301 becomes high, the total end signal PVFEND which is the output of the AND gate 1306 is rendered high (⑭ in FIG. 6A).

The total processing end signal PVFEND is sent to the instruction control circuit 103 (FIG. 8). The instruction control circuit 103 releases the suppression of the fetch signal FT2 to the vector X and sends the fetch request signal FT2 for the next element of the vector X to the main memory 111 ( ⑮ in FIG. 6). In this manner, the compression processing to the next partial vector Δ2 of the vector Y is initiated.

As shown in the time charts of FIGS. 6A and 6B, this processing can be initiated with the loss of only three clocks.

Finally, a case where the processing of the bottom vector element (element 1 in the present instance) of the vector X has been completed is described. In this case, the comparator 904 detects that the index CTR 2 designated by the OP. 2 execution element counter 952 has exceeded the content of the element length register 903. Thus, when the total processing end signal PVFEND is supplied from the total end detection circuit 107 (FIG. 13), the instruction end signal MEND 176 which is the output of the AND gate 905 is rendered "1" and it is sent to the instruction control signal 103 (FIG. 8) so that the subsequent fetch and store signals are suppressed and the execution of the compression instruction is terminated.

After the termination of the compression instruction, the vector Z of FIG. 3A is stored in the main memory 111 as the first operand vector of the instruction. Each element of the vector Z comprises pairs of indices of the top elements and the indices of the bottom elements of the partial vectors Δ3 and Δ4. They indicate the partial vectors Δ3 and Δ4 comprising adjacent vector elements in which key values are duplicate in the partial vectors Δ1 and 2 designated on the vector Y by the vector X. The method for implementing the compression instruction has thus been completed.

The operation of the processor of FIG. 1 when the multi-sort instruction is executed is now explained in detail.

Like the compression instruction, the multi-sort instruction has the instruction format shown in FIG. 5A.

In the multi-sort processing shown in FIG. 3B, the vectors Z, Y and W are used as the second, third and first operands, respectively. Accordingly, the data or addresses shown in the right column of FIG. 5B are preset in the quotation register GPR (R1).

In the instance of FIG. 3B, the sort processing is performed until the sorting is completed for the two partial vectors Δ3 of the vector Y designated by the vector Z in the multi-sort processing of the present embodiment. The vector W holds the interium result vector of the sort processing as shown in FIG. 4. When the sorting of the partial vector Δ3 is completed, the sorting is continuously effected for the partial vector Δ4.

Figure 7:
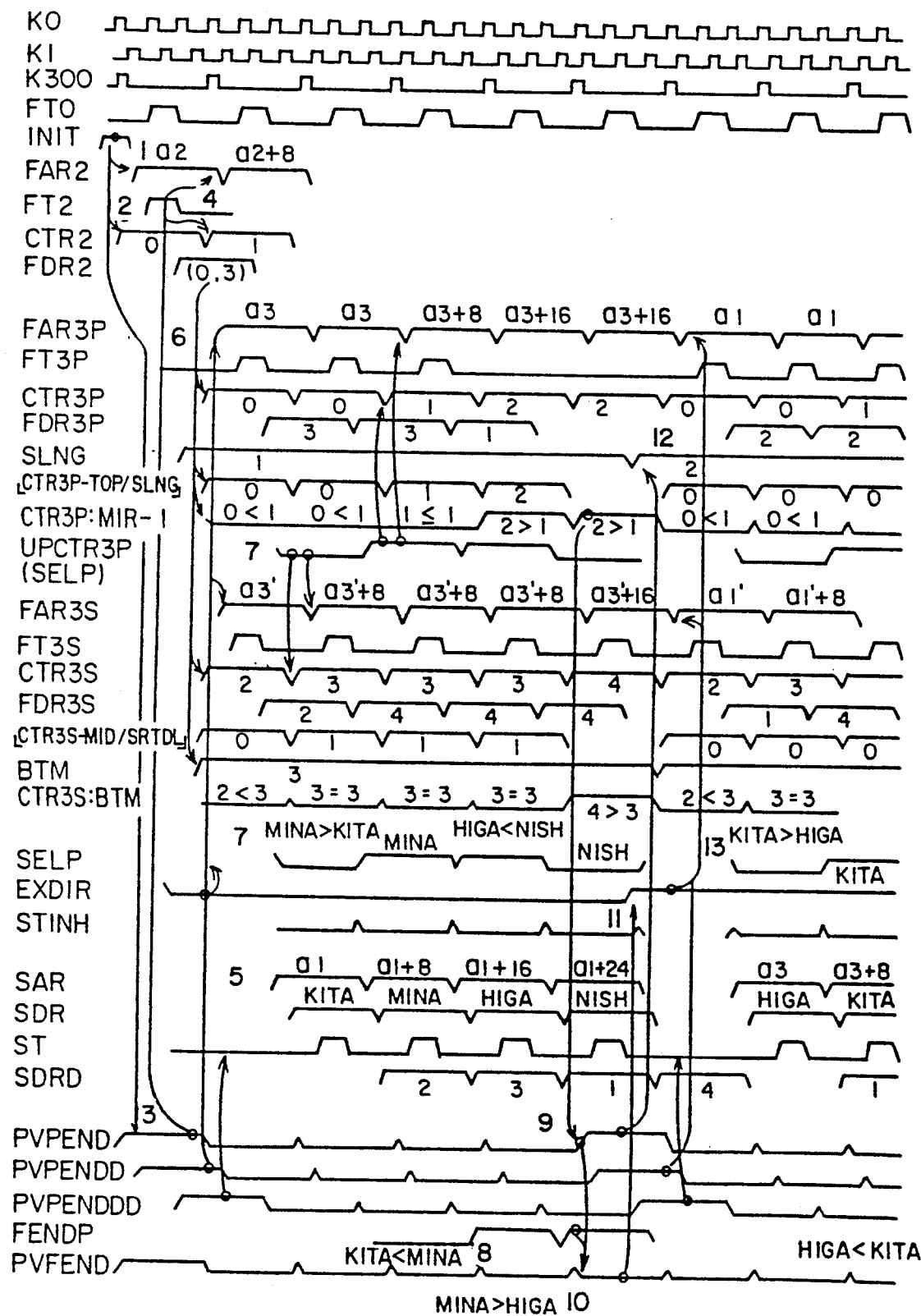
FIG. 7 shows a time chart for the multi-sort processing.

FIG. 7 shows the time chart for the operation of the processor of FIG. 1 when the multi-sort processing shown in FIG. 3B is performed.

As described in connection with FIG. 4, when one partial vector (for example, Δ3) of the vector Y is to be sorted, the merge/sort processes 401 and 402 are repeatedly performed. In this case, in each merge/sort process, for example, 401, the partial vector Δ3 is divided into two vectors each consisting of one-half elements, and the merge/sort process is applied to those two vectors, and the result is stored in the vector W. In the next merge/sort process 402, the vector W is divided into two vectors and they are merged and sorted. Accordingly, in the merge/sort processing, it is necessary to fetch two partial vectors of the vector Y or W to be sorted. The OP. 3 first fetch address circuit 1098 and the OP. 3 second fetch address circuit 1097 in the address control circuit 110 (FIG. 10) are used to generate the addresses for fetching those two vectors.

The OP. 1 store address circuit 1096 is used to generate the address for writing the interium sort result into the vector W or Y. The OP. 2 fetch address circuit 1099 is used to fetch the vector Z. It is necessary to switch the fetch addresses from the vectors Y and W or the write addresses therein for each merge/sort process (401, etc.). The partial vector top address generation circuit 1051 determines the initial values of the fetch addresses and the write addresses, and the address switching circuit 1095 selectively supplies the generated addresses to the address circuits 1096 to 1098. It is also necessary to switch the vector to be sorted and the sort result store vector for each merge/sort process so that one of the vectors Y and W is used as the vector to be sorted and the other is used as the vector for storing the interium sort result. The processing direction designation circuit 183 in the partial vector processing control circuit 105 (FIG. 13) directs the switching.

As described above, in each merge/sort process, for example, 401, the partial vector Δ3 is divided into two vectors for sorting. The operation unit 1305 determines the index MID of the vector element which is a boarder in dividing the partial vector Δ3 into two vectors. The minimum sorted element length SLNG is used to determine MID. This value is held in the register 1303, and it is updated by the +1 adder 2303 each time the partial vector processing end signal PVPEND is generated.

On the other hand, the OP. 3 first execution element counter 950 and the OP. 3 second execution element counter 951 in the operation control circuit 104 (FIG. 9) are used to count the indices CTR3P and CTR3S of the vector elements fetched from the OP. 3 first fetch address circuit 1098 and the OP. 3 second fetch address circuit 1096 in the partial vector processing control circuit 105 (FIG. 13).

Figures 12A, 12B:
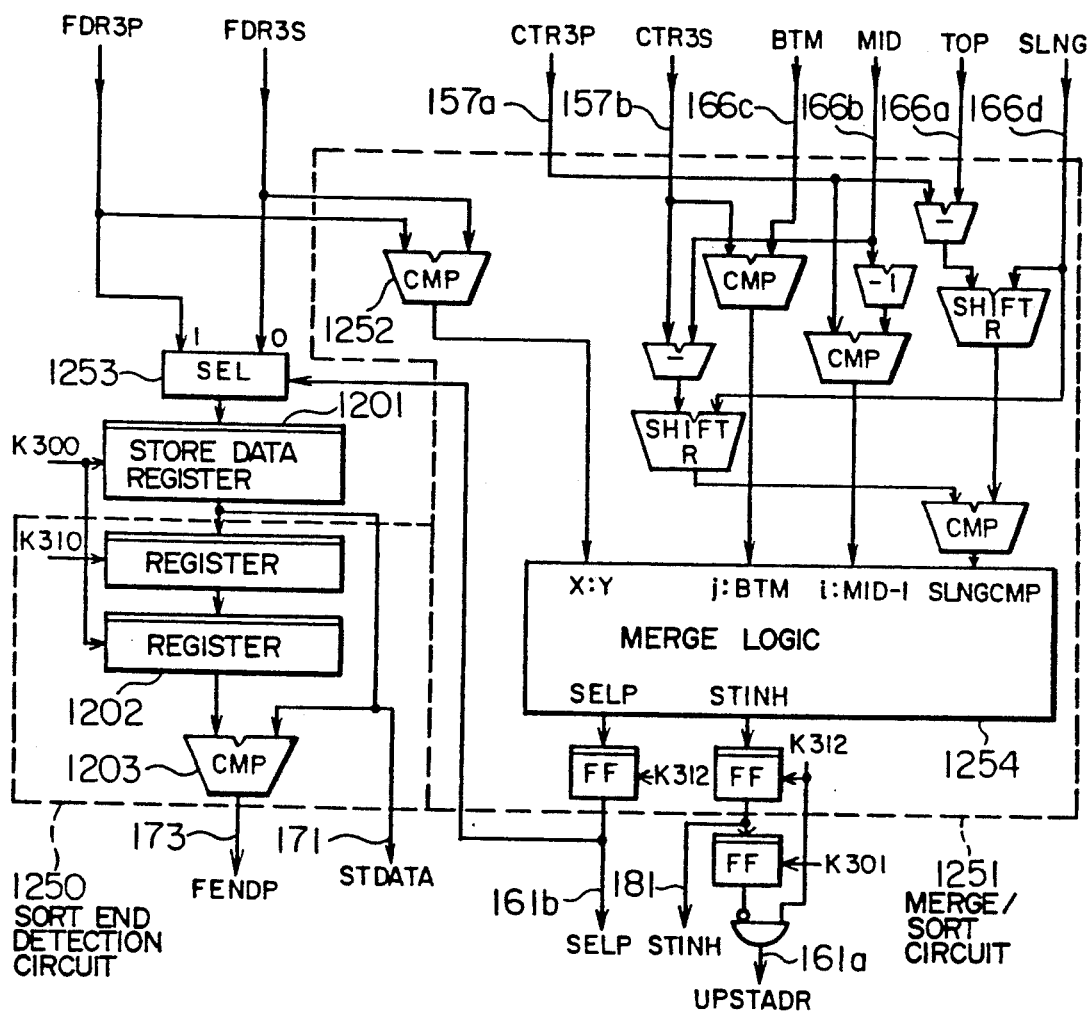
FIG. 12A shows a circuit diagram of a sort circuit 191 used in the processor of FIG. 1.
FIG. 12B shows an operation condition of a merge logic 1254 of FIG. 12A.

FIG. 12A shows a circuit diagram of the sort operation circuit 191. Numeral 1251 denotes a circuit which sorts the two vectors by comparing by the comparator 1252 the key portions of the elements FDR3P and FDR3S which belong to the two vectors to be sorted, fetched from the main memory 111 by the OP. 3 first fetch address circuit 1098 and the OP. 3 second fetch circuit 1097 (both in FIG. 10).

In the above description, as shown in FIG. 4, the vector to be sorted (for example, the partial vector Δ3 of the vector Y) is divided into two vectors and they are repeatedly merged and sorted. In the repetition, the vectors Y and W are replaced. Those and the operation of the merge/sort circuit 1251 of FIG. 12 are similar to the technique disclosed in U.S. application Ser. No. 685,116 (filed on Dec. 21, 1984) assigned to the present assignee. This technique is incorporated herein by reference.

A characteristic feature to the present embodiment in FIG. 4 resides in that the sort processing is performed for the partial vector (for example, Δ3) in the vector Y based on the top element index TOP and the bottom element index BTM designated by the elements in the vector Z, and that when the sorting for the partial vector Δ3 is completed, the sorting for the partial vector Δ4 designated by the next element of the vector Z is continuously performed.

A characteristic feature to the present embodiment in FIG. 12A resides in that whether two vectors to be sorted have been sorted or not is detected by the sort end detection circuit 1250 before the number of times of repetition of the merge/sort process (401, etc. in FIG. 4) reaches a predetermined number, and that if the completion is detected, the merge/sort process for the same vectors is stopped.

When the multi-sort instruction is decoded by the decode circuit 102, the circuits are initialized at the time of decoding of the compression instruction. The address (a2 in FIG. 7) of the top element of the vector Z is set into the register 1001 in the OP. 2 fetch address circuit 1099 (FIG. 10), and the top addresses of the vectors Y and W are set into the registers 1002 and 1003 in the partial vector top address generation circuit 1051 (FIG. 10).

In the partial vector processing control circuit of FIG. 13, like in the compression processing, the partial vector processing end signal PVPEND produced by the partial end detection circuit 180 is rendered "1" in response to the initialization signal INIT, and in response thereto, the selector SEL which switches the input to the SLNG register 1303 selects the initial value "0". In this manner, the SLNG register 1303 in the top element index generation circuit (FIG. 13) is set to the initial value "0".

In the processing direction designation circuit 183, the flip-flop 1304 is reset to "0" in response to the same signal PVPEND. Thus, the initialization step is over. The OP. 2 fetch address circuit 1099 (FIG. 10) fetches the first element (0, 3) of the vector Z from the main memory 111. The first four bytes of the element represent the index TOP of the top element of the partial vector Δ3 of the vector Y to be sorted, and the second four bytes of the element represent the index BTM of the bottom element of the partial vector Δ3. Based on the indices TOP and BTM included in the first element of the vector Z and the minimum sorted element length SLNG in the register 1303, the operation unit 1305 in the element index generation circuit 182 (FIG. 13) calculates the intermediate index in accordance with the following formula:

$$MID = TOP + \lfloor \frac{BTM - TOP + 1 + 2^{SLNG}}{2^{SLNG+1}} \rfloor \times 2^{SLNG}$$

where $\lfloor \quad \rfloor$ represents a floor function. The MID represents the index of the top element of the partial vector consisting of lower order elements 2 and 3 when the partial vector Δ3 of the vector Y is divided into two partial vectors, higher order vector and lower order vector for merge/sort processing 401 (FIG. 4). Needless to say, the index of the top element of the higher order partial vector consisting of the elements 0 and 1 is equal to TOP.

Figure 9A:
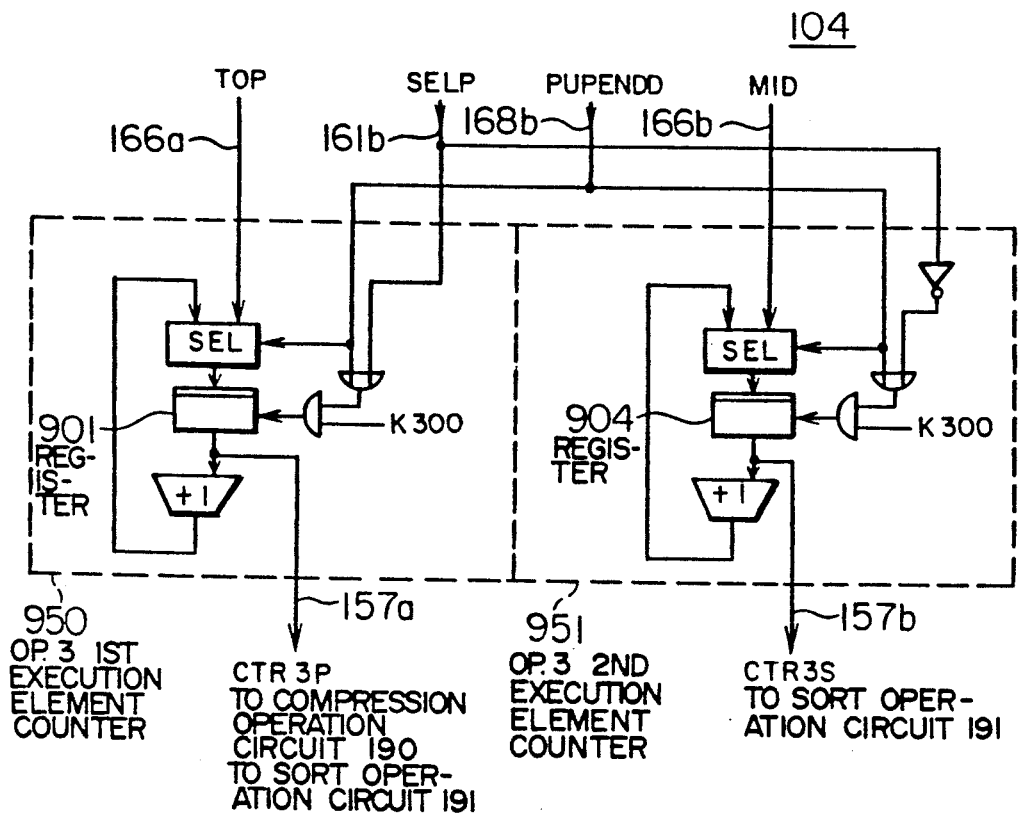
Figure 9B:
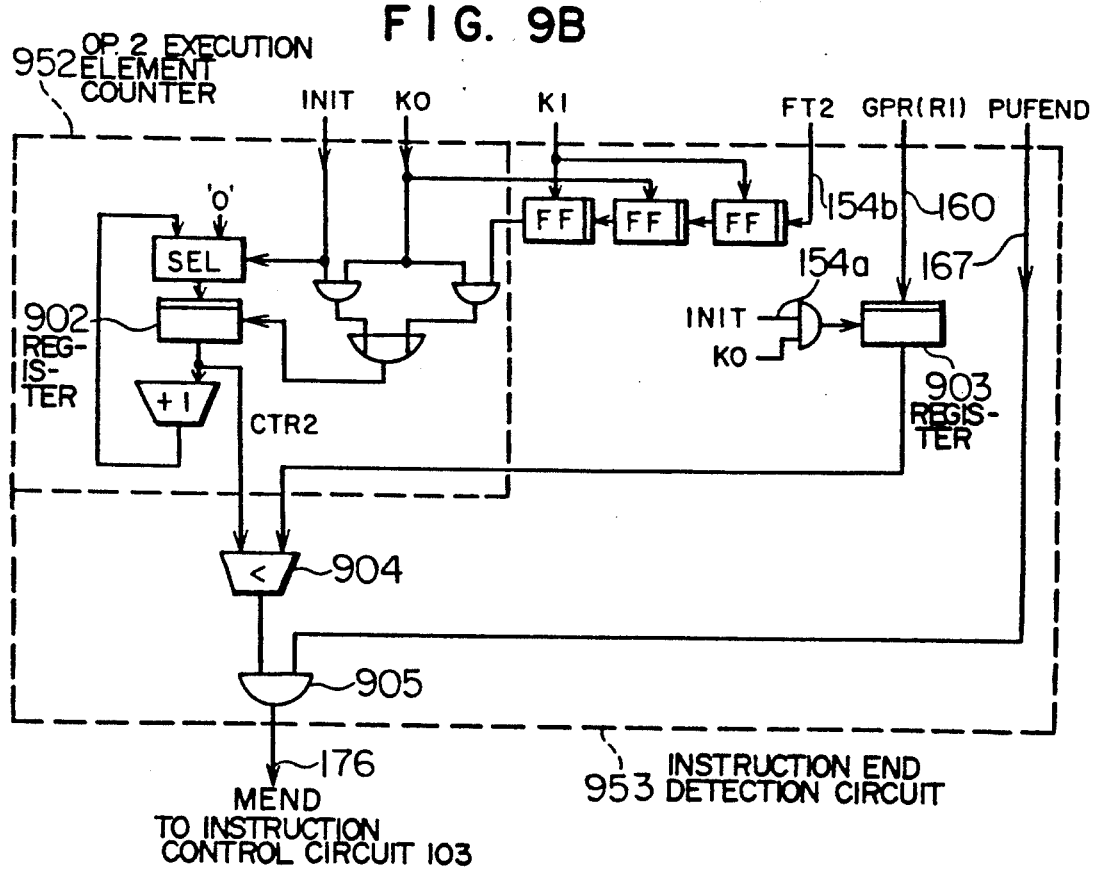

The indices TOP and BTM are sent from the element index generation circuit 182 to the address control circuit 110 (FIG. 10), the sort operation circuit 191 (FIG. 12A) and the operation control circuit 104 (FIG. 9). The BTM is also sent to the sort operation circuit 191 (FIG. 12) and the MID is sent to the partial end detection circuit 180.

In the partial vector top address generation circuit 1051 of the address control circuit 110 (FIG. 10), the address of the top element (the element having the index TOP, or the element 0 in the present instance) of the higher order partial vector of the partial vector Δ3 of the vector Y is generated by the 3-bit left shifter 1094 and the adder 2094 based on the input index TOP and the top element address (a3 in FIG. 7) of the vector Y which is initially set in the register 1002, and it is set into the register 1004. This address is used by the OP. 3 first fetch address circuit 1098 to fetch the higher order partial vector of the vector Y.

Similarly, the address of the top element (the element having the index MID, or the element 2 in the present instance) of the lower order partial vector of the partial vector Δ3 is generated by the 3-bit left shifter 3094 and the adder 4094 based on the input intermediate index MID and the top element address of the vector Y in the register 1002, and it is set into the register 1006. This address is used to fetch the lower order partial vector of the vector Y by the OP. 3 second fetch address circuit 1097.

On the other hand, the element (the element 0) of the vector W corresponding to the top element (the element having the index TOP, or the element 0 in the present instance) of the partial vector Δ3, of the vector Y is generated by the 3-bit left shifter 2099 and the adder 3099 based on the top element address (al in FIG. 7) of the vector W in the register 1003 and the input index TOP, and it is set into the register 1010. This address is used to write the result of the merge/sort process (for example, 401 in FIG. 4) for the vector Y by the OP. 1 store address circuit 1096.

Conversely, the following address is generated by the partial vector top address generation circuit 1051 in order to divide the partial vector on the vector W into two partial vectors, higher order vector and lower order vector for merge/sort processing, as is done in the merge/sort process 402 of FIG. 4.

The address of the top element (the element having the index TOP, or the element 0 in the present instance) of the higher order partial vector resulting from the division of the partial vector of the vector W to be merged and sorted is calculated by the 3-bit left shifter 2095 and the adder 3095 based on the top element address of the vector W set in the register 1003 and the input index TOP, and it is set into the register 1007.

This address is used when the merge/sort process such as the process 402 is performed to the partial vector on the vector W by the OP. 3 first fetch address circuit 1098.

Similarly, the address of the top element (the element having the index MID, or the element 2 in the present instance) of the lower order partial vector resulting from the division of the partial vector of the vector W to be sorted is calculated by the 3-bit shifter 2098 and the adder 3098 based on the top address of the vector W set in the register 1003 and the intermediate index MID, and it is set into the register 1008. This address is used when the merge/sort process such as the process 402 is performed to the partial vector in the vector W by the OP. 3 second fetch address circuit 1079.

In order to store the result of the merge/sort process such as the process 402 into the vector Y, the address of the top element (the element having the index TOP) of the partial vector (Δ3) of the vector Y is calculated by the 3-bit shifter 2096 and the adder 3096 based on the top element address of the vector Y in the register 1002 and the index TOP, and it is set into the register 1009. This address is later used by the OP. 1 store address circuit 1096.

The flip-flop 1304 in the processing direction designation circuit 183 of FIG. 13 for designating the processing direction is set to the initial value "0" as described above. In response to the signal "0", the selector 1013 in the address switching circuit 1095 selects the address of the top element (the element having the index TOP) of the partial vector Δ3 of the vector Y set in the register 1004, and supplies it to the OP. 3 first fetch address circuit 1098. Similarly, the selector 1014 selects the address of the intermediate element (the element having the index MID) of the partial vector Δ3 set in the register 1006, and supplies it to the OP. 3 second fetch address circuit 1097. Similarly, the selector 1015 selects the address of the element having the index TOP, of the vector W in the register 1010. Since the instruction decode signal INST is "1" in the decode mode of the sort instruction, the selector 4000 selects the address provided by the selector 1015 and sends it to the OP. 1 store address circuit 1096.

On the other hand, the instruction control circuit 103 (FIG. 8) produces the fetch elements FT3P and FT3S in the multi-sort processing in association with the OP. 3 first fetch address circuit 1098 and the OP. 3 second fetch address circuit 1097. In this manner, the higher order partial vector and the lower order partial vector of the partial vector Δ3 of the vector Y are fetched, and the fetched elements are supplied to the sort operation circuit 191 as the fetch data FDR3P and FDR3S.

On the other hand, in the operation control circuit 104, when the top element (0, 3) of the vector Z is fetched from the main memory 111, the element index generation circuit 182 (FIG. 13) provides that element and the front-half four bytes are supplied to the OP. 3 first execution element counter 950 as the TOP, and the rear-half four bytes are supplied to the OP. 3 second execution element counter 951 as the BTM. They are utilized as the initial values of the counters. Thereafter, each time the sorting for a pair of vector elements is performed by the sort operation circuit 191, the counts of the counters are updated in response to the signal SELP produced by the sort operation circuit 191.

The operation of the OP. 2 execution request element counter 952 is same as that for the compression processing.

In the merge/sort circuit 1251 of the sort operation circuit 191 (FIG. 12A), numeral 1252 denotes a comparator for comparing the key portions of the pair of vector elements FDR3P and FDR3S fetched from the main memory 111, and numeral 1254 denotes a merge logic circuit for generating a signal to control the merge processing. Basically, as a result of the comparison by the comparator 1252, a smaller one of the element FDR3P of the higher order partial vector of the partial vector Δ1 of the vector Y fetched by the OP. 3 first fetch address circuit 1098 and the element FDR3S of the lower order partial vector of the partial vector Δ1 is stored into the main memory 111, and the element following to the smaller element and the larger element are again fetched from the main memory 111 and the comparison and the store into the main memory 111 are repeated. The indices CTR3P and CTR3S of the fetch data FDR3P and FDR3S are supplied to the merge/sort circuit 1251 from the operation control circuit 104 (FIG. 9), and the indices TOP, BTM and MID and the minimum sorted element length SLNG are supplied from the element index generation circuit 182. Those data are mutually compared to produce the signals SELP and STINH on the condition shown in FIG. 12B.

The operation of the merge/sort circuit 1251 is similar to the one disclosed in the above-mentioned U.S. application Ser. No. 685,116 and hence the detail thereof is omitted.

The signal SELP is "1" when the data FDR3P is smaller than the data FDR3S, and the signal STINH is normally "0" as shown in the item numbers 1 to 6. When the signal SELP is "1", the selector 1253 selects the data FDR3P and sends it to the main memory 111 as the store data SDATA. Since the signal STINH is normally "0", the instruction control circuit 103 (FIG. 8) produces the store request signal ST so that the above data is written into the vector W. The write address is given by the OP. 1 store address circuit 1096 (FIG. 10).

In response to the value "0" of the signal STINH, the sort operation circuit 191 renders the signal UPSTADR "1" to direct the updating of the address to the address circuit 1096. On the other hand, when the signal SELP is "1", the address FAR3P in the OP. 3 first fetch address circuit 1098 in FIG. 10 is updated. It is used to fetch the next element of the higher order partial vector of the partial vector Δ3. On the other hand, when the signal SELP is "0", the fetch data FDR3S is selected by the selector 1253, and it is set into the store data register 1201 and then written into the main memory 111 as the store data STDATA. In response to the value "0" of the signal SELP, the address FAR3S generated by the OP. 3 second fetch address circuit 1097 (FIG. 10) is updated. In this manner, the next element of the lower order partial vector of the partial vector Δ3 is fetched and the merge/sort process is newly performed.

The sort end detection circuit 1250 is FIG. 12A is a characteristic circuit to the present embodiment. As shown in FIG. 4, it is known that the sorting is completed by repeating the merge/sort processes 401 and 402 by the number of times determined by the number of elements of the vector to be sorted the partial vector Δ3 or Δ4 in FIG. 4).

However, in some cases, the sorting is completed without repeating the merge/sort processes by the predetermined number of times.

The end of sorting means that the data train after the sorting is in a predetermined sequence (the alphabetic ascending order in the present embodiment). The two adjacent data having the same value are considered as in the alphabetic ascending order.

In such a case, if the end of sort is detected, it is not necessary to uselessly repeat the merge/sort process. A specific method for detecting the end of sort is now explained.

Whether the data to be sorted have been sorted in the ascending order or not is determined by comparing the key portion in the store data register 1207 and the key portion in the register 1202 which holds the data fetched one cycle earlier, by the comparator 1203. If the former is larger as a result of the comparison, the sort incomplete signal FENDP is sent to the operation mode flip-flop 1302 in the total end detection circuit 107 (FIG. 3) through the AND gate 5000.

The other input to the AND gate 5000 is the instruction decode signal INST, which is "1" for the multi-sort instruction. Thus, when the sorting is incomplete, the flip-flop 1302 is set (⑧ in FIG. 7).

The index CTR3P of the element of the higher order partial vector of the partial vector Δ1 and the index CTR3S of the element of the lower order partial vector and supplied to the partial end detection circuit 180 from the operation control circuit 104 (FIG. 9). On the other hand MID-1 generated by the subtractor 5020 based on the intermediate index MID supplied from the element index generation circuit 182 (FIG. 13) is selected by the selector SEL, and it is compared with the index CTR3P by the comparator 1303. On the other hand, the index CTR3S and the index BTM are compared by the comparator 1306.

When the merge/sort process to the partial vector Δ3 proceeds and the comparators 1303 and 1306 detect CTR3P>MID and CTR3S>BTM, the partial end register 1301 is set by the output of the AND gate 5040 so that the partial end signal is rendered high (⑨ in FIG. 7). In this case, however, since the partial vector operation mode flip-flop 1302 is high, the output of the AND gate 1306 is "0" and the total end signal PVFEND is not produced (⑩ in FIG. 7). Accordingly, this indicates that sort process to the partial vector is to be repeated.

On the other hand, the sorted element length SLNG (1303) in the element index generation circuit 182 is incremented by the partial processing end signal PVPEND and the output SLNG of the register 13 is rendered "1" (⑫ in FIG. 7). Since the partial processing end signal PVPEND is "1" and the total end signal PVFEND is "0", the AND gates connected to the flip-flop 1304 in the processing direction designation signal circuit 183 set the flip-flop 1304. As a result, the signal EXDIR is rendered "1" ( 11 in FIG. 7) to be ready to the next merge/sort process (402 in FIG. 4).

The mode flip-flop 1302 is set by the signal PVPEND2D which is produced by delaying the partial vector processing end signal PVPEND.

In response to the value "1" of the processing direction designation signal EXDIR, the address switching circuit 1095 of the address control circuit 110 (FIG. 10) supplies the content of the register 1007 to the OP. 3 first fetch address circuit 1098, the content of the register 1008 to the OP. 3 second fetch address circuit 1097, and the content of the register 1009 to the OP. 1 store address circuit 1096, by the selectors 1013, 1014 and 1015, respectively. Those addresses are set in the address registers 1011, 1012 and 1013 in the respective circuits in response to the partial processing end signal PVPEND ( ⑬ in FIG. 7).

In the operation control circuit 104 (FIG. 9), the TOP and MID are set as the initial values for the counters 950 and 951, respectively, in response to the signal PVPENDD which is 0.5 clock behind the partial processing end signal.

Through the above process, the processing direction for the partial vector is switched, and after three clocks, the second run of the merge/sort process 402 (FIG. 4) is initiated. For this merge/sort process, the sort incomplete signal FENDP is not produced by the sort end detection circuit 1250 (FIG. 12A) in the partial vector Δ3. Accordingly, the flip-flop data has been sorted and the mode 1302 remains reset. Under this condition, when the partial processing end signal PVPEND is produced by the register 1301, the AND gate 1306 produces the total processing end signal PVFEND so that the next partial vector designation information is fetched as is done for the compression instruction. Thus far, the detection of the end of the merge/sort process for the partial vector has been described.

After the multi-sort instruction has been totally executed, the vector 212 of FIG. 3B results in the main memory 111. As seen from the drawing, the elements in the partial vectors Δ3 and Δ4 of the vector 212 have been sorted.

By using the compression processing and the multi-sort method, it is possible to sort by the vector processing the keys which are longer than the data length determined by the vector processor.

The partial keys are extracted by the sortable data length starting from the top of the keys, they are sorted, the unsorted portions are searched, and the above process is repeated for only the records which require re-sorting. Accordingly, as the keys are referenced up to certain time point to determine the magnitude relationship of the records, the remaining portions of the keys need not be reference. Thus, reduction of efficiency due to the reference to the entire long keys is avoided.

In an extreme example where the magnitude relationship of all keys is determined by the top four bytes of the key, the sorting method of the present embodiment performs the sort process by the vector instruction only once. Accordingly, the performance which does not depend on the key length is attained.

The advantage of the multi-sort processing of the present embodiment is shown quantitatively. For comparison purpose, the HITACHI "built-in data base processor for M680H computer" is used as a conventional vector processor.

It is assumed that an average of the number of elements of the partial vectors to be multi-sorted is m, the number of partial vectors in n/m, the set-up time for the vector instruction is a, and the number of clocks required for switching of the partial vectors in the multisort processing is b. The sort processing time is given by:

$$\text{Conventional processor: } n \log m + \frac{n}{m} \log m \Big) \times a$$

$$\text{Present embodiment: } n \log m + \frac{n}{m} \log m \Big) \times b$$

When above parameters are m=20, n=10³, a=50 and b=1, $$\frac{\text{Conventional processor}}{\text{Present embodiment}} + 3.3$$

Thus, the speed is increased as much as approximately three times. In the above comparison, the execution time for the scalar instruction train for sequentially fetching a plurality of partial vector designation information and setting up the instructions to start the vector instruction, which is an essential process in the conventional processor, is not considered. If this is taken into consideration, the acceration rate of the present embodiment is higher.

In the present embodiment, the pair of indices of the top processing element and the bottom processing element are used as the elements of the partial vector designation vector. Alternatively, the pair of the index of the top processing element and the number of elements in the partial vector may be used.

In the present embodiment, the merge/sort processing method shown in the above-mentioned U.S. application Ser. No. 685,116 is used as the operation unit for implementing the sort processing for the partial vector. Alternatively, a natural merge/sort processing method shown in Japanese Patent Application 62-086846 may be used. In this case, the number of times of switching of the processing mode in the execution of the natural merge/sort processing is used as the total sort end signal FENDP of the present embodiment.

In accordance with the present invention, the sorting of any fixed length key data is attained in the vector processor having a limitation on the sortable data length. A mechanism to detect the partial areas (partial vectors) on a vector, which frequently appear in the vectorization of the non-numeric operation and generate vector data as the partial vector designation information is provided. It is possible to input the vector data comprising the generated partial vector designation information to vector-process the partial vectors collectively.

We claim:

1. A vector processor, comprising:
   means for sequentially supplying vector elements of one vector;
   detecting means connected to said supplying means and responsive to each of the vector elements supplied thereby for detecting whether said each vector element satisfies a predetermined condition;
   determining means connected to said detecting means and responsive to detection results given thereby for successive vector elements of the one vector for determining whether each vector element of the one vector is a top vector element or a bottom vector element of one or plural partial vectors within the one vector, each partial vector comprising vector elements all of which satisfy the condition;
   means connected to said determining means and responsive to determination thereby of a top vector element of one of the one or plural partial vectors for retaining position information of the top vector element; and
   means connected to said determining means and responsive to determination thereby of a bottom vector element of the one partial vector for generating a pair of position information including position information of the bottom vector element and the retained position information of the top vector element of the one partial vector as a vector element corresponding to the one partial vector of another vector whose vector elements are to be formed corresponding to the partial vectors within the one vector.

2. A vector processor according to claim 1, wherein said vector elements of the one vector includes partial key data portions according to which portions the vector elements are to be sorted; and wherein the condition to be satisfied by a vector element is that a partial key data portion of the vector element is the same as a corresponding partial key data portion of an immediately preceding vector element, and wherein said detecting means includes a comparator for comparing a partial key data portion of the vector element with a corresponding partial key data portion of an immediately preceding vector element.

3. A vector processor according to claim 1, wherein said condition to be satisfied by a vector element is that at least a portion of the vector element is equal to a corresponding portion of an immediately preceding vector element, and wherein said detecting means includes a comparator for comparing a portion of a vector element to a corresponding portion of an immediately preceding vector element.

4. A vector processor for processing a first vector comprised of a plurality of vector elements based upon a second vector having vector elements which each include position information designating a respective partial vector within the first vector, each partial vector comprising one or plural predetermined successive vector elements of the first vector, comprising:
   first means for sequentially supplying the elements of the second vector;
   second means connected to said first means and responsive to the supply of each vector element of the second vector for selectively supplying vector elements belonging to one of the partial vectors within the first vector, determined by said supplied vector element of the second vector;
   operation means for performing a predetermined operation on the supplied vector elements belonging to one partial vector; and
   control means connected to said first means and said operation means for controlling said first means so that a succeeding vector element of the second vector is supplied in response to an end of execution of the operation by said operation means on the vector elements belonging to the one partial vector of the first vector, determined by the one vector element of the second vector, supplied by said first means.

5. A vector processor according to claim 4, wherein the position information included in each vector element of the second vector designates a pair of a top vector element and a bottom vector element of a partial vector corresponding to said each vector element of the second vector.

6. A vector processor according to claim 4, wherein said vector processor further includes:
   means connected to said operation means and responsive to result vector elements provided thereby for one partial vector for replacing vector elements of said one partial vector with the result vector elements;
   means connected to said operation means for detecting whether the result vector elements conform to desired results; and
   means connected to said detecting means for requesting said second means to supply to said operation means the vector elements of the one partial vector after the replacing operation, so that said operation means re-executes the predetermined operation on the vector elements after the replacing operation, said requesting means further requesting said control means to cause said first means to delay supply of the next vector element of the second vector element during a re-execution by said operation means.

7. A vector processor according to claim 6, wherein said predetermined operation comprises sorting of vector elements belonging to each one of the partial vectors within the first vector based upon parts of key data portions included in those vector elements; wherein each vector element of the first vector includes at least a partial key data portion; and said detecting means includes means for detecting whether the vector elements in the one partial vector have been completely sorted.

* * * * *